United States Patent
Li et al.

(10) Patent No.: US 11,963,017 B2
(45) Date of Patent: Apr. 16, 2024

(54) INTERFERENCE CONTROL METHOD AND APPARATUS, RESPONSE MESSAGE SENDING METHOD AND APPARATUS, RESPONSE MESSAGE FORWARDING METHOD AND APPARATUS, COMMUNICATION DEVICE, AND COMMUNICATION SYSTEM

(71) Applicant: ZTE Corporation, Guangdong (CN)

(72) Inventors: Dapeng Li, Guangdong (CN); Yin Gao, Guangdong (CN); Yang Liu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 385 days.

(21) Appl. No.: 17/280,082

(22) PCT Filed: Sep. 26, 2019

(86) PCT No.: PCT/CN2019/108110
§ 371 (c)(1),
(2) Date: Mar. 25, 2021

(87) PCT Pub. No.: WO2020/063732
PCT Pub. Date: Apr. 2, 2020

(65) Prior Publication Data
US 2022/0046432 A1 Feb. 10, 2022

(30) Foreign Application Priority Data
Sep. 26, 2018 (CN) .......................... 201811126942.9

(51) Int. Cl.
*H04W 24/02* (2009.01)
*H04L 5/00* (2006.01)
*H04W 8/26* (2009.01)

(52) U.S. Cl.
CPC ........... *H04W 24/02* (2013.01); *H04L 5/0048* (2013.01); *H04W 8/26* (2013.01)

(58) Field of Classification Search
CPC ....... H04W 24/02; H04W 8/26; H04W 92/20; H04L 5/0048; H04J 11/0056; H04B 17/345
See application file for complete search history.

(56) References Cited

U.S. PATENT DOCUMENTS

| | | |
|---|---|---|
| 2014/0362814 A1 | 12/2014 | Haim et al. |
| 2015/0173011 A1 | 6/2015 | Das et al. |

(Continued)

FOREIGN PATENT DOCUMENTS

| | | |
|---|---|---|
| CN | 101227225 A | 7/2008 |
| CN | 102655650 A | 9/2012 |

(Continued)

OTHER PUBLICATIONS

Specification for U.S. Appl. No. 62/717,724 (Year: 2021).*

(Continued)

*Primary Examiner* — Afshawn M Towfighi
(74) *Attorney, Agent, or Firm* — Wolf, Greenfield & Sacks, P.C.

(57) ABSTRACT

Provided are an interference control method and apparatus, a response message sending method and apparatus, a response message forwarding method and apparatus, a communication device, and a communication system. A reference signal sent by a victim base station carries an addressing identifier. The addressing identifier corresponds to route information of a victim node set. Thus, when an aggressor base station monitors the reference signal, an aggressor node set may send a response message to the victim node set according to the addressing identifier, so that the victim base station in the victim node set can respond to the message to (Continued)

determine that the aggressor base station has received the reference signal sent by the victim base station.

20 Claims, 8 Drawing Sheets

(56) References Cited

U.S. PATENT DOCUMENTS

| | | | |
|---|---|---|---|
| 2020/0044764 A1* | 2/2020 | Xu | H04L 5/0048 |
| 2021/0321417 A1* | 10/2021 | Kim | H04L 5/0048 |
| 2021/0328749 A1 | 10/2021 | Barac et al. | |
| 2022/0053556 A1* | 2/2022 | Cao | H04W 52/143 |
| 2023/0247465 A1* | 8/2023 | Ibrahim | H04W 24/08 370/252 |

FOREIGN PATENT DOCUMENTS

| | | |
|---|---|---|
| CN | 103517281 A | 1/2014 |
| CN | 103748815 A | 4/2014 |
| CN | 106165502 A | 11/2016 |
| CN | 106941679 A | 7/2017 |
| EP | 2 575 402 A1 | 4/2013 |
| EP | 2 930 982 A1 | 10/2015 |
| EP | 3 850 775 A1 | 7/2021 |
| JP | 2011-519505 A | 7/2011 |
| JP | 2011-526450 A | 10/2011 |
| JP | 2012-169698 A | 9/2012 |
| JP | 2017-510103 A | 4/2017 |
| JP | 2021-517365 | 4/2022 |
| WO | WO 2009-120127 A1 | 10/2009 |
| WO | WO 2010-006692 A1 | 1/2010 |
| WO | WO 2014/194852 A1 | 12/2014 |
| WO | WO 2015/061924 A1 | 5/2015 |
| WO | PCT/CN2019/108110 | 1/2020 |
| WO | WO 2020/053767 A1 | 3/2020 |

OTHER PUBLICATIONS

Chinese Office Action dated Sep. 28, 2021 in connection with Chinese Application No. 201811126942.9.
International Search Report dated Jan. 2, 2020 in connection with International Application No. PCT/CN2019/108110.
[No Author Listed], Draft Summary on Study on NR-RIM. 3GPP TSG RAN WG1 Meeting #94. R1-1809973. CMCC. Aug. 20-24, 2018. 30 pages.
[No Author Listed], Draft Summary on Study on NR-RIM. 3GPP TSG RAN WG1 Meeting #94. R1-1809865. CMCC. Aug. 20-24, 2018. 31 pages.
Japanese Office Action dated Apr. 8, 2022, in connection with Japanese Application No. 2021-517365.
Extended European Search Report dated May 18, 2022, in connection with European Application No. 19867726.2.
Chinese Office Action dated Mar. 24, 2022, in connection with Chinese Application No. 20181126942.9.
[No Author Listed], Discussion on procedure for NR RIM Support. 3GPP TSG RAN WG1. Meeting #94. LG Electronics. Aug. 20-24, 2018. 5 pages.
[No Author Listed], On mechanism for improving network robustness in presence of remote interference.3GPP TSG-RAN WG1 Meeting #94. R1-1808822. Ericsson. Aug. 20-24, 2018, 5 pages.
[No Author Listed], $3^{rd}$ Generation Partnership Project; Technical Specification Group Radio Access Network; Study on remote interference management for NR (Release 16). 3GPP TR 38.866, v0.0.0. Aug. 2018. 10 pages.
[No Author Listed], Agreements on NR-RIM frameworks. 3GPP TSG-RAN WG1 Meeting #94. CMCC. Aug. 20-24, 2018. 3 pages.
[No Author Listed], Draft Report of 3GPP TSG RAN WG1. Meeting #94. XP051517462A. MCC Support. Oct. 8-12, 2018. 187 pages.
Yong et al., Research and response on atmospheric duct interference in TDD system. China Mobile Group. 2018. 6 pages.

* cited by examiner

US 11,963,017 B2

INTERFERENCE CONTROL METHOD AND APPARATUS, RESPONSE MESSAGE SENDING METHOD AND APPARATUS, RESPONSE MESSAGE FORWARDING METHOD AND APPARATUS, COMMUNICATION DEVICE, AND COMMUNICATION SYSTEM

CROSS REFERENCES TO RELATED APPLICATIONS

This Application is a national stage filing under 35 U.S.C. §371 of International Patent Application Serial No. PCT/CN2019/108110, filed on Sep. 26, 2019, entitled INTERFERENCE CONTROL METHOD AND APPARATUS, RESPONSE MESSAGE SENDING METHOD AND APPARATUS, RESPONSE MESSAGE FORWARDING METHOD AND APPARATUS, COMMUNICATION DEVICE, AND COMMUNICATION SYSTEM. Foreign priority benefits are claimed under U.S.C. § 119(a)-(d) or 35 U.S.C. § 365(b) of Chinese Patent Application No. 201811126942.9, filed on Sep. 26, 2018. The contents of these applications are incorporated herein by reference in their entirety.

TECHNICAL FIELD

The present disclosure relates to the field of communications and, in particular, to an interference control method and apparatus, a response message sending method and apparatus, a response message forwarding method and apparatus, a communication device and a communication system.

BACKGROUND

When an atmospheric waveguide phenomenon occurs, the distance that a downlink radio signal of a base station may be propagated is extended, and the propagation delay exceeds a protection gap (GP), thus causing interference to an uplink signal of another base station. The interfered base station may be referred to as a victim node. The base station that interferes with the victim base station may be referred to as an aggressor node. Some effective solutions are urgently needed to reduce or eliminate atmospheric waveguide interference.

SUMMARY

Embodiments of the present disclosure provide an interference control method and apparatus, a response message sending method and apparatus, a response message forwarding method and apparatus, a communication device and a communication system.

An embodiment of the present disclosure provides an interference control method. The method includes: sending a reference signal carrying an addressing identifier, where the addressing identifier corresponds to route information of a victim node set, and the victim node set includes a victim base station; determining, according to a response message sent by an aggressor node set, that an aggressor base station receives the reference signal, where the aggressor base station belongs to the aggressor node set; and performing atmospheric waveguide interference control in cooperation with the aggressor base station.

An embodiment of the present disclosure provides a response message forwarding method. The method includes: receiving response information sent by an aggressor node set after the aggressor node set monitors a reference signal of a victim base station, where the response information includes an addressing identifier corresponding to route information of a victim node set, the aggressor node set includes an aggressor base station, and the victim node set includes the victim base station; determining the route information corresponding to the addressing identifier of the victim node set according to a pre-acquired mapping between addressing identifiers of various node sets and route information of the various node sets; and sending a response message to the victim node set according to the determined route information.

An embodiment of the present disclosure provides a response message sending method. The method includes: monitoring a reference signal, where the reference signal carries an addressing identifier corresponding to route information of a victim node set, and the victim node set includes a victim base station; and sending, after monitoring the reference signal sent by the victim base station, a response message to the victim node set according to the addressing identifier carried in the reference signal, where the response message is used for indicating that an aggressor base station monitors the reference signal sent by the victim base station.

An embodiment of the preset disclosure provides another response message sending method. The method includes: acquiring a monitoring result of a reference signal by a base station belonging to a set center node of an aggressor node set, where the reference signal carries an addressing identifier corresponding to route information of a victim node set, the victim node set includes a victim base station, and the aggressor node set includes an aggressor base station; and sending a response message to the victim node set according to the addressing identifier carried by the reference signal monitored by the aggressor base station, where the response message is used for indicating to the victim base station that the aggressor base station monitors the reference signal.

An embodiment of the present disclosure provides an interference control apparatus. The interference control apparatus includes a reference sending module, a response determination module and an interference control module. The reference sending module is configured to send a reference signal carrying an addressing identifier, where the addressing identifier corresponds to route information of a victim node set, and the victim node set includes a victim base station. The response determination module is configured to determine, according to a response message sent by an aggressor node set, that an aggressor base station receives the reference signal, where the aggressor base station belongs to the aggressor node set. The interference control module is configured to perform atmospheric waveguide interference control in cooperation with the aggressor base station.

An embodiment of the present disclosure provides a response message forwarding apparatus. The apparatus includes a response reception module, a route determination module and a response forwarding module. The response reception module is configured to receive response information sent by an aggressor node set after the aggressor node set monitors a reference signal of a victim base station, where the response information includes an addressing identifier corresponding to route information of a victim node set, the aggressor node set includes an aggressor base station, and the victim node set includes the victim base station. The route determination module is configured to determine the route information corresponding to the addressing identifier of the victim node set according to a pre-acquired mapping between addressing identifiers of various node sets and route information of the various node sets. The response forwarding module is configured to send a response message to the victim node set according to the route information.

An embodiment of the present disclosure provides a response message sending apparatus. The apparatus includes a reference monitoring module and a first response sending module. The reference monitoring module is configured to monitor a reference signal, where the reference signal carries an addressing identifier corresponding to route information of a victim node set, and the victim node set includes a victim base station. The first response sending module is configured to send, after monitoring the reference signal sent by the victim base station, a response message to the victim node set according to the addressing identifier carried in the reference signal, where the response message is used for indicating that an aggressor base station monitors the reference signal sent by the victim base station.

An embodiment of the preset disclosure provides another response message sending apparatus. The apparatus includes a monitoring acquisition module and a second response sending module. The monitoring acquisition module is configured to acquire a monitoring result of a reference signal by a base station belonging to a set center node of an aggressor node set, where the reference signal carries an addressing identifier corresponding to route information of a victim node set, the victim node set includes a victim base station, and the aggressor node set includes an aggressor base station. The second response sending module is configured to send a response message to the victim node set according to the addressing identifier carried by the reference signal monitored by the aggressor base station, where the response message is used for indicating to the victim base station that the aggressor base station monitors the reference signal.

An embodiment of the present disclosure further provides a communication device. The communication device includes a processor, a memory and a communication bus. The communication bus is configured to implement connection and communication between the processor and the memory. The processor is configured to execute an interference control program stored in the memory, so as to perform the steps of the interference control method above. Alternatively, the processor is configured to execute a response message forwarding program stored in the memory, so as to perform the steps of the response message forwarding method above. Alternatively, the processor is configured to execute a first response message sending program stored in the memory, so as to perform the steps of the response message sending method. Alternatively, the processor is configured to execute a second response message sending program stored in the memory, so as to perform the steps of the response message sending method above.

An embodiment of the present disclosure further provides a communication system. The communication system includes a victim node set and an aggressor node set that can communicate with each other. The victim node set includes a victim base station. The aggressor node set includes an aggressor base station. The victim base station is a communication device whose processor can execute the interference control program above. The aggressor base station is a communication device whose processor can execute the first response message sending program above.

An embodiment of the present disclosure further provides a storage medium. The storage medium stores at least one of an interference control program, a response message forwarding program, a first response message sending program or a second response message sending program. The interference control program is executable by one or more processors to perform the steps of the interference control method above. The response message forwarding program is executable by one or more processors to perform the steps of the response message forwarding method above. The first response message sending program is executable by one or more processors to perform the steps of the response message sending method above. The second response message sending program is executable by one or more processors to perform the steps of the response message sending method above.

According to the interference control method and apparatus, the response message sending method and apparatus, the response message forwarding method and apparatus, the communication device and the communication system in the embodiments of the present disclosure, the reference signal sent by the victim base station carries the addressing identifier, where the addressing identifier corresponds to the route information of the node set to which the victim base station belongs. That is, the addressing identifier corresponds to the route information of the victim node set, and thus, after the aggressor base station monitors the reference signal sent by the victim base station, the aggressor node set may send the response message to the victim node set according to the addressing identifier, so that the victim base station in the victim node set can respond to the message to determine that the aggressor base station has received the reference signal sent by the victim base station, and thereby, other processes of the atmospheric waveguide interference control are performed next. By carrying the addressing identifier in the reference signal, it is possible for an aggressor node side to send a message to a victim node side. An aggressor base station side sends the message to a victim base station side to notify the victim base station that the aggressor base station has monitored the reference signal, so that the victim base station can perform the subsequent processes of the atmospheric waveguide interference control in cooperation with the aggressor base station next, thereby helping to implement the atmospheric waveguide interference control.

DETAILED DESCRIPTION

To make the objects, solutions and advantages of the present disclosure more apparent, embodiments of the present disclosure are further described below in detail in conjunction with specific implementations and drawings.

Embodiment One

Under certain weather conditions, the low density at higher altitudes in the earth atmosphere leads to a decrease in refractive index, so that a signal is bent trajectory to the earth. In this case, since reflected and refracted at the boundary of a low refractive index material, a signal may be propagated in a higher refractive index layer, that is, an atmospheric guide. This phenomenon is referred to an atmospheric waveguide. In the propagation mode of the atmospheric waveguide, a radio signal experiences less attenuation and can be propagated in a range much larger than a normal radiation distance. The atmospheric waveguide phenomenon usually occurs in a spring-summer transition period and a summer-autumn transition period in an inland area and a winter in a coastal area. A frequency affected by the atmospheric waveguide phenomenon ranges from 0.3 GHz to 30 GHz.

Figure 1:
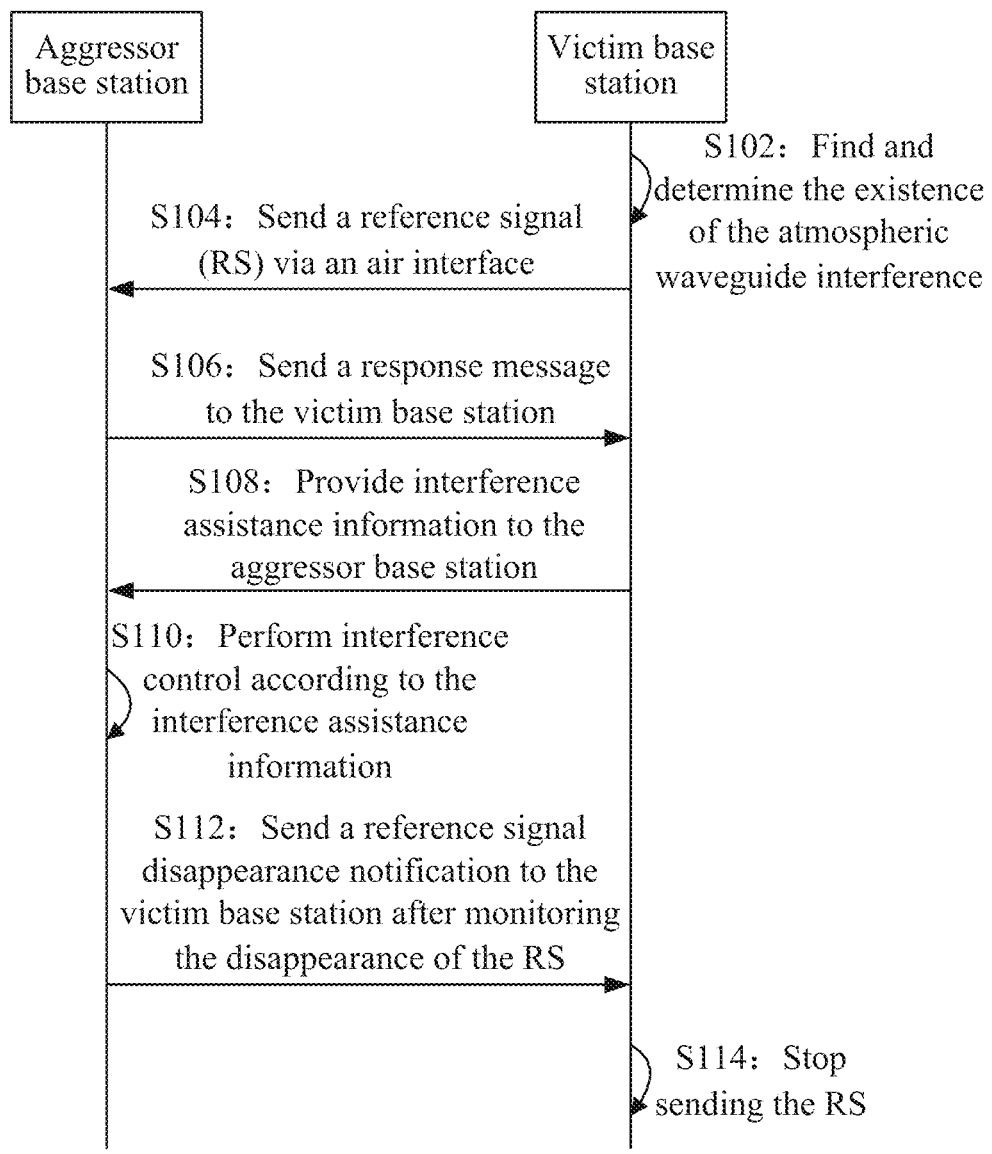
FIG. 1 is a flowchart of an atmospheric waveguide interference control method according to embodiment one of the present disclosure.

In a time division duplexing (TDD) network configured in the same uplink transmission direction and the same downlink transmission direction, cross-link interference is avoided by using a protection gap. However, when the atmospheric waveguide phenomenon occurs, the distance that a radio signal of a certain base station may be propagated for a larger distance (up to 300 kilometers), and the propagation delay also exceeds the protection gap. This phenomenon may last for several hours or tens of hours, interfering with an uplink signal of a victim base station far away from the certain base station (that is, an aggressor base station). This interference is referred to as remote interference. The greater influence the aggressor base station has on the victim base station, the more symbols on an uplink of the victim base station are interfered. In this case, atmospheric waveguide interference control is needed to avoid affecting communications between the victim base station for a long time and thus causing the problem of poor communication quality of users. To solve the atmospheric waveguide interference problem, this embodiment first describes an atmospheric waveguide interference control solution. Please refer to the flowchart shown in FIG. 1.

In step S102, a victim base station finds and determines the existence of atmospheric waveguide interference.

When the victim base station monitors serious quality decrease of some uplinks, it may be determined, by detections, whether the decrease is due to the atmospheric waveguide interference.

In step S104, the victim base station sends a reference signal (RS) via an air interface.

When the victim base station determines the existence atmospheric waveguide interference, the RS may be sent via the air interface.

It is to be understood that the aggressor base station may monitor the RS to determine whether there is a victim base station interfered by the aggressor base station currently.

In step S106, the aggressor base station sends a response message to the victim base station.

If the aggressor base station monitors the RS, the response message may be sent to the victim base station that sends the RS, so as to notify the victim base station that the aggressor base station has currently detected the RS sent by the victim base station.

In step S108: the victim base station provides interference assistance information to the aggressor base station.

After receiving the response message from the aggressor base station, the victim base station may learn that the aggressor base station has detected the RS sent by the victim base station. Thus, the victim base station may send the interference assistance information to the aggressor base station. The interference assistance information mainly helps the aggressor base station to know the related situation of the atmospheric waveguide interference to the victim base station, so that the aggressor base station can determine an atmospheric waveguide interference control strategy.

In step S110, the aggressor base station performs interference control according to the interference assistance information.

After receiving the interference assistance information, the aggressor base station determines, according to the interference assistance information, the strategy of how to perform the atmospheric waveguide interference control by the aggressor base station, thereby implementing the atmospheric waveguide interference control.

It is to be understood that after the victim base station receives the response message sent by the aggressor base station, the sending of the RS is not stopped immediately. Therefore, while the atmospheric waveguide interference control, the aggressor base station may further monitor the RS sent by the victim base station. If the aggressor base station can further monitor the RS, it is indicated that the current atmospheric waveguide interference control has no effect. If the aggressor base station determines, by monitoring, that the aggressor base station cannot monitor the RS of the victim base station, it may be determined that the current atmospheric waveguide interference control has taken effect.

In step S112, the aggressor base station sends a reference signal disappearance notification to the victim base station after monitoring the disappearance of the RS.

Therefore, after the aggressor base station monitors the disappearance of the RS, that is, after the aggressor base station determines that the aggressor base station cannot monitor the RS sent by the victim base station, the reference signal disappearance notification may be sent to notify the victim base station that the aggressor base station has not detected the RS currently.

In step S114, the victim base station stops sending the RS.

When the victim base station receives the reference signal disappearance notification sent by the aggressor base station, the sending of the RS may be stopped.

However, for the aggressor base station, the RS sent by the victim base station is sent via the air interface, so although the aggressor base station may monitor the RS sent by the victim base station, the aggressor base station cannot determine a routing address of the victim base station. As to how the aggressor base station implements step S108, this embodiment provides an interference control solution. Before a description of the interference control solution, the concept of "node set" is firstly described below.

In this embodiment, one or more base stations may be divided into a set referred to as a "node set (Set)" (or a "node cluster"). The node set may have a set center node. Each base station in the node set may be connected to the set center node. In some examples of this embodiment, each base station in the same node set may pertain to the same operator network or the same shared operator. It is to be understood that the node set may be divided by an operator. For example, the operator divides one or more base stations that are frequently interfered or frequently interfere with other base stations into one node set according to historical data.

Figure 2:
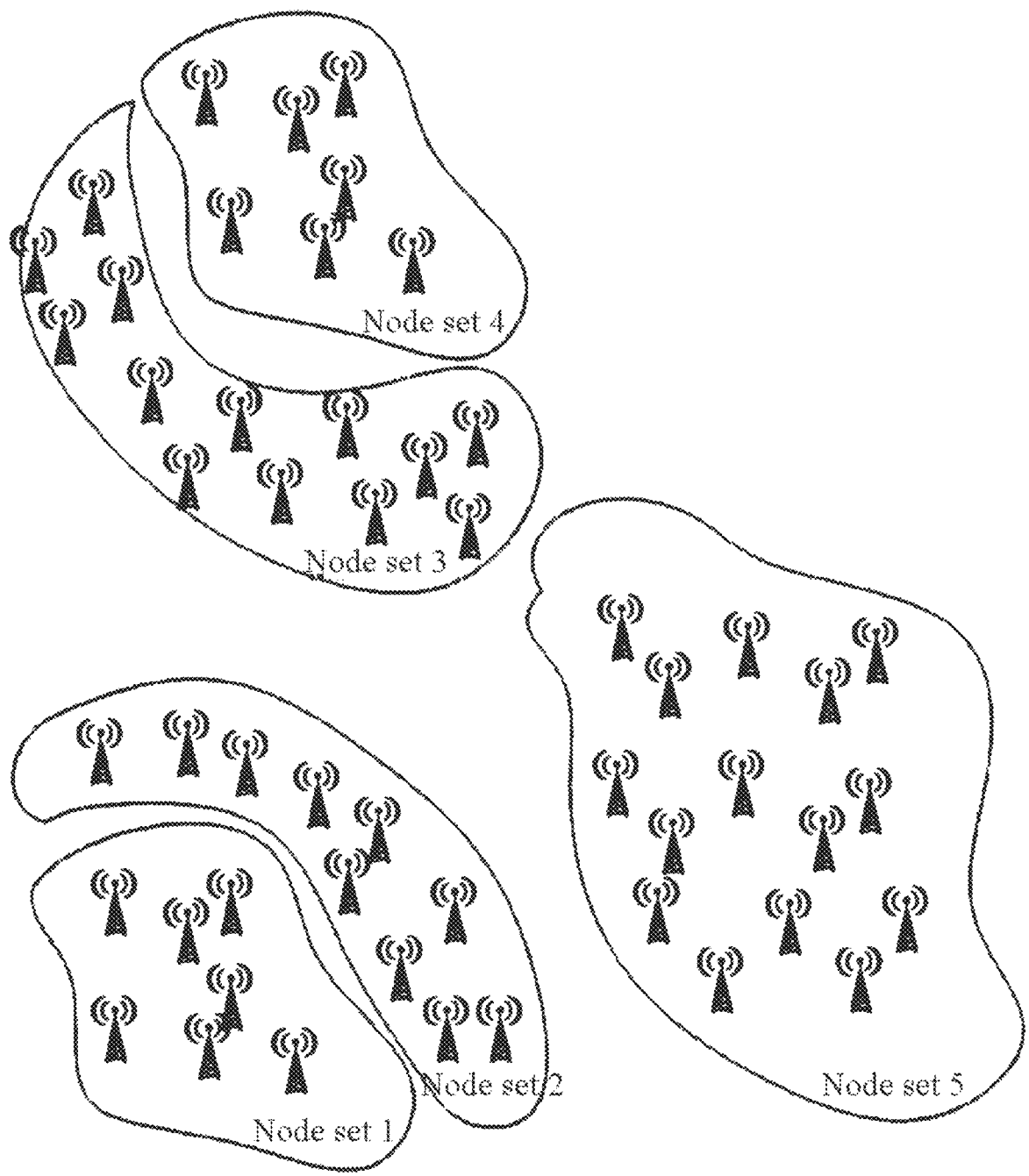
FIG. 2 is a diagram showing a division of node sets according to embodiment one of the present disclosure.

Referring to FIG. 2, the operator may divide different sets according to empirical data. For example, although a base station in Set 1 is in a neighboring position of a base station of Set 2, the base station in Set 1 is not connected to the same core network element as the base station in Set 2. Therefore, although having consistent features in the atmospheric waveguide interference, these base stations are still divided into different node sets. Meanwhile, FIG. 2 also illustrates Set 3 and Set 4. Although neighboring to each other, a base station in Set 3 and a base station in Set 4 are divided into two node sets since the base stations in these two node sets belong to different operators. Certainly, the operator may divide neighboring base stations into the same set, for example, Set 5 in FIG. 2.

In some examples of this embodiment, node sets may be divided according to a cell granularity since different cells belonging to the same base station may be interfered by different interference sources. For example, a base station has tens of cells, but interference sources of some cells may have different directions and distances due to different antenna angles and other deployments. Therefore, sets may be divided according the cell granularity.

In this embodiment, a node set to which the victim base station belongs in the atmospheric waveguide interference is referred to as a "victim node set", and a node set to which the aggressor base station belongs is referred to as an "aggressor node set". The victim node set includes a set center node. The aggressor node set includes a set center node. The set center node includes, but is not limited to, any one of a core network element, a base station or a centralized device (CU).

Figure 3:
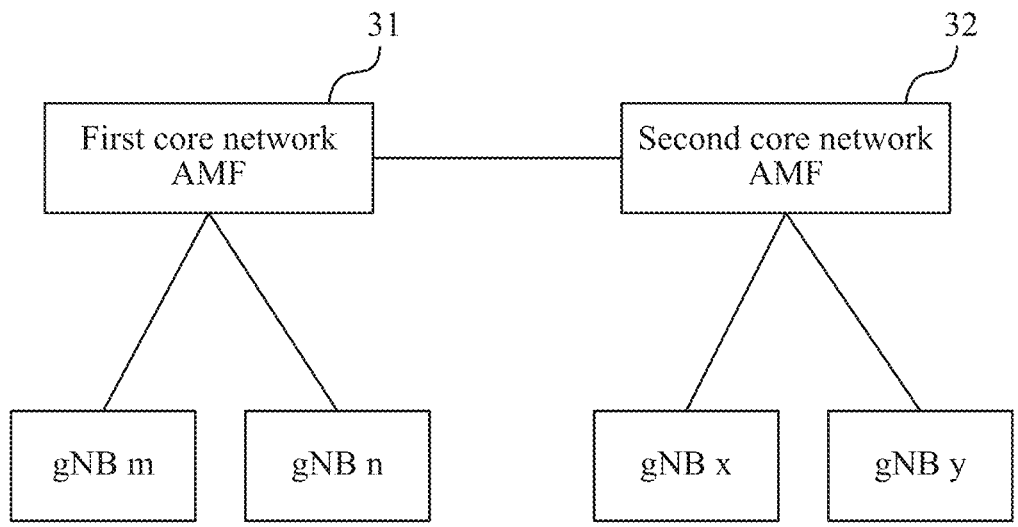
FIG. 3 is a diagram showing two node sets each using an access mobility function as a set center node according to embodiment one of the present disclosure.

The preceding core network element may refer to any one of an AMF network element, a mobility management entity (MME) network element and the like. FIG. 3 is a diagram showing two node sets each using a core network element AMF as a set center node. 5G base stations gNB m and gNB n belong to a first node set and may be each connected to a first core network element AMF 31 via an NG interface. gNB x and gNB y belong to a second node set and may be each connected to a set center node of a second node set, that is, a second AMF network element 32, via an NG interface. It is to be understood that FIG. 3 shows the situation in a 5G communication system. In a 4G communication system, a base station may be connected to a core network element of a set center node via a 4G S1 interface. In FIG. 3, the set center nodes of the two node sets, that is, the first AMF network element 31 and the second AMF network element 32, may communicate with each other via N14 interfaces.

Figure 4:
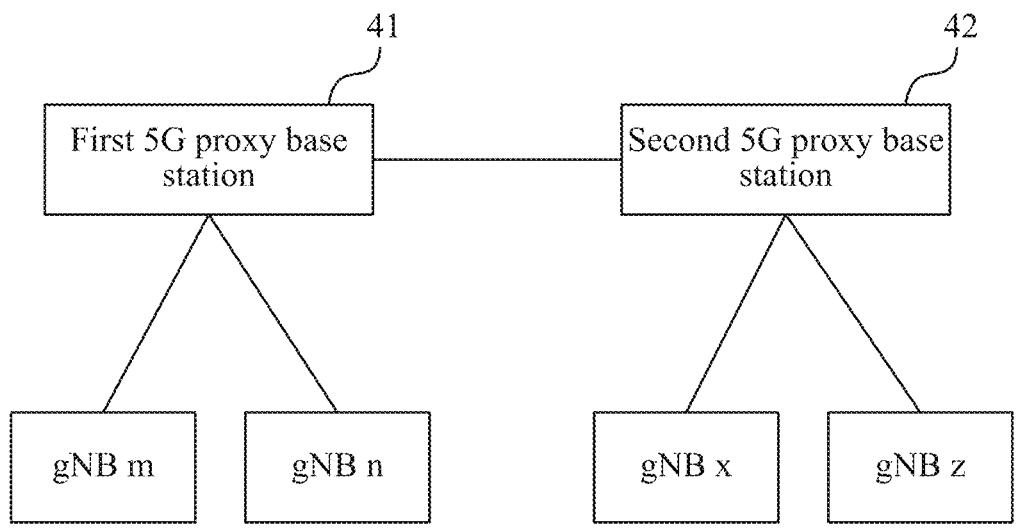
FIG. 4 is a diagram showing two node sets each using a 5G proxy base station as a set center node according to embodiment one of the present disclosure.

FIG. 4 is a diagram showing a node set using a gNB proxy (5G proxy base station) as a set center node. gNB m and gNB n belong to a first node set and may be each connected to a first gNB proxy 41 via an Xn interface. gNB x and gNB z belong to a second node set and may be each connected to a set center node, that is, a second gNB proxy 42, of a second node set via an Xn interface. The two set center nodes, that is, the first gNB proxy 41 and the second gNB proxy 42, may communicate with each other via Xn interfaces. Similarly, FIG. 4 shows the situation in a 5G communication system. In a 4G communication system, base stations may be connected to each other via X2 interfaces.

Figure 5:
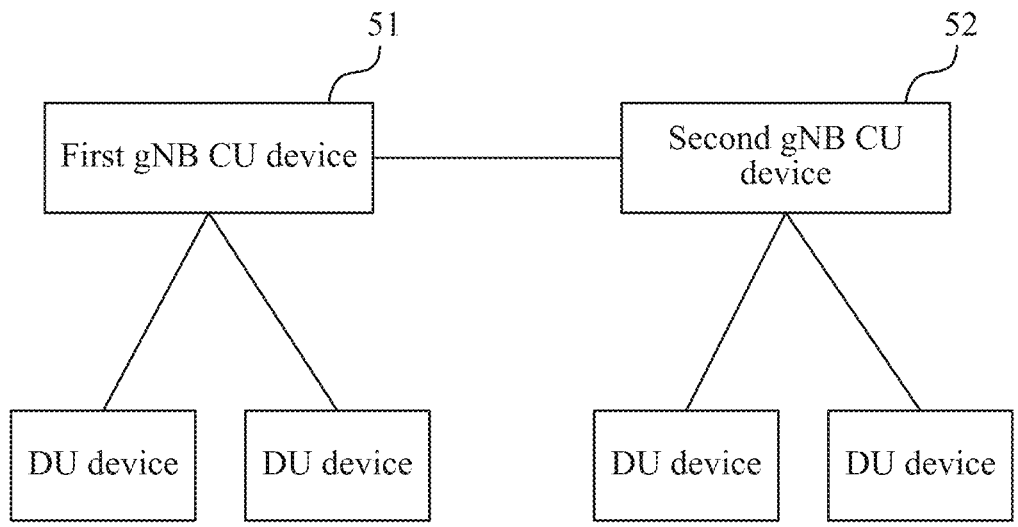
FIG. 5 is a diagram showing two node sets each using a centralized unit (CU) as a set center node according to embodiment one of the present disclosure.

The CU device and a distributed unit (DU) device connected to the CU device may form a complete base station. In this case, if the CU device is used as a set center node, the complete base station forms a node set. For example, in FIG. 5, a first base station may be used as a first node set, and a first gNB CU device 51 in the first base station may be used as a set center node of the first node set; and a second base station may be used as a second node set, and a second gNB CU device 52 in the second base station may be used as a set center node of the second node set. The first gNB CU device 51 and the second gNB CU device 52 may be connected and communicate to each other via Xn interfaces between the first base station and the second base station. Certainly, a 4G base station has some differences, and base stations are connected via X2 interfaces. In FIG. 5, in a base station, a DU device may be connected to a CU device via an F1 interface.

The node set has a set identifier (set ID) (or a cluster identifier (cluster ID)). It is to be understood that the set identifier of the node set may have a length of one byte or multiple bytes, the set identifier may uniquely distinguish the node set, and set identifiers may be uniformly allocated by the operator for the whole network. In some examples of this embodiment, in view of the wide range of atmospheric waveguide interference, long-range interference across operators may occur, so node sets of different operators may need to identify each other. Therefore, in these examples, the set identifier of the node set may further be combined with an operator network identifier to implement the function of uniquely identifying the node set in the world. For example, the set identifier is combined with a public land mobile network (PLMN).

Figure 6:
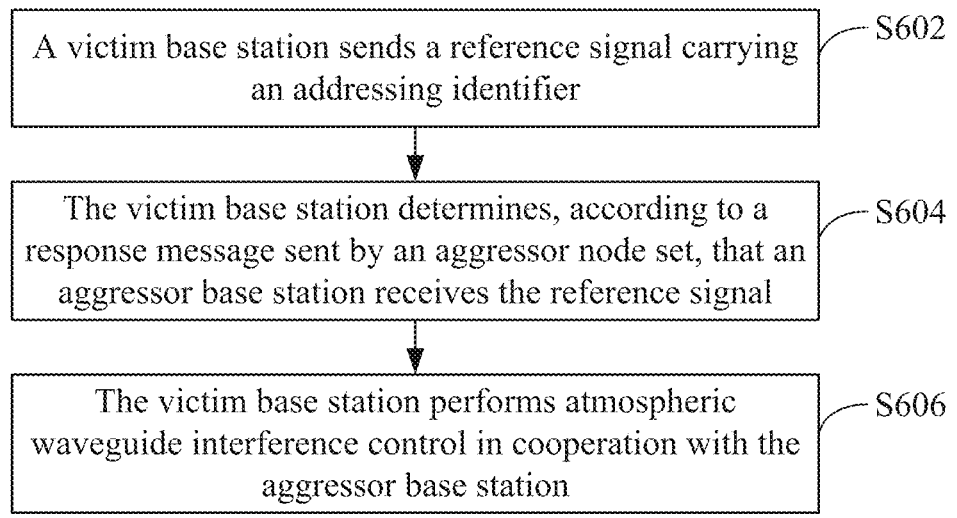
FIG. 6 is a flowchart of an interference control method according to embodiment one of the present disclosure.

The interference control method provided in this embodiment is described below in conjunction with the flowchart shown in FIG. 6.

In step S602, a victim base station sends a reference signal carrying an addressing identifier.

In this embodiment, when the victim base station determines that there is currently atmospheric waveguide interference affecting the victim base station, the reference signal may be sent. The reference signal carries the addressing identifier corresponding to route information of the victim base station. The addressing identifier can enable an aggressor base station monitoring and receiving the reference signal to have an opportunity to send a response message to the victim node set.

In some examples of this embodiment, the addressing identifier may be the set identifier of the victim node set. In this case, a core network element may be pre-notified of correspondence between the set identifier of the victim node set and the route information of the victim node set. When needing to send the response message according to the reference signal, the aggressor base station or an aggressor node set may at least send the response message to the victim node set with the help of the core network element. For example, in an example of this embodiment, if the route information of the victim node set is route information of the set center node, the response message may be sent to the set center node in the victim node set, so that the set center node of the victim node set may notify the victim base station of the response message sent by the aggressor node set. In other examples of this embodiment, the route information of the victim node set may refer to route information of a certain base station in the node set.

In other examples, the correspondence between the set identifier of the victim node set and the route information of the victim node set may be stored in a network management or a domain name system (DNS) server. In this way, when needing to send the response message, the aggressor node set may at least acquire the route information of the victim node set according to the mapping stored by the network management or the DNS server, so that the response message corresponding to the reference signal is sent to the victim node set, for example, to the set center node of the victim node set. Then, the set center node notifies the victim base station that the aggressor base station sends the response message.

It is to be understood that in some examples of this embodiment, when the set center node of the node set is the core network element, the addressing identifier may be a core network identifier of the core network.

In other examples of this embodiment, the addressing identifier carried in the reference signal may be relevant information of the victim base station, for example, may be directly a base station identifier of the victim base station. In this case, after the aggressor node set receives the reference signal, the response message may be directly sent to the victim base station according to the base station identifier in the reference signal.

In some examples of this embodiment, the information carried in the reference signal is not limited to the addressing identifier. For example, in some examples, the reference signal further includes at least one of the following pieces of information: 1) an addressing type, 2) an Internet protocol (IP) address of the victim base station, 3) a cell identifier of an interfered cell, 4) a tracking area identity (TAI) of an interfered cell, 5) a TAI of the victim base station, 6) a TAI of the node set to which the victim base station belongs, or 7) an operator network to which an interfered cell pertains, 7) an operator network to which the victim base station pertains, or 8) an operator network to which the node set to which the victim base station belongs pertains.

The victim base station sends the reference signal after determining that the victim base station is affected by the atmospheric waveguide interference. In order for the victim base station to determine whether the victim base station is affected by the atmospheric waveguide interference, this embodiment provides the two determination modes described below. The victim base station may determine in at least one of these two modes.

Mode 1: The victim base station determines, on the basis of an independent interference detection result of the victim base station, that the victim base station is currently interfered by an atmospheric waveguide.

It is to be understood that a base station cannot be referred to as the victim base station until the base station determines that the base station is interfered by the atmospheric waveguide.

However, a base station that has been determined as the victim base station will definitely perform atmospheric waveguide interference detections. In mode 1, the base station, including the base station that later determined as the victim base station, may independently determine whether the base station is currently interfered by the atmospheric waveguide. For example, it is determined whether the atmospheric waveguide interference phenomenon occurs by measuring an uplink signal in a cell of the base station.

Figure 7:
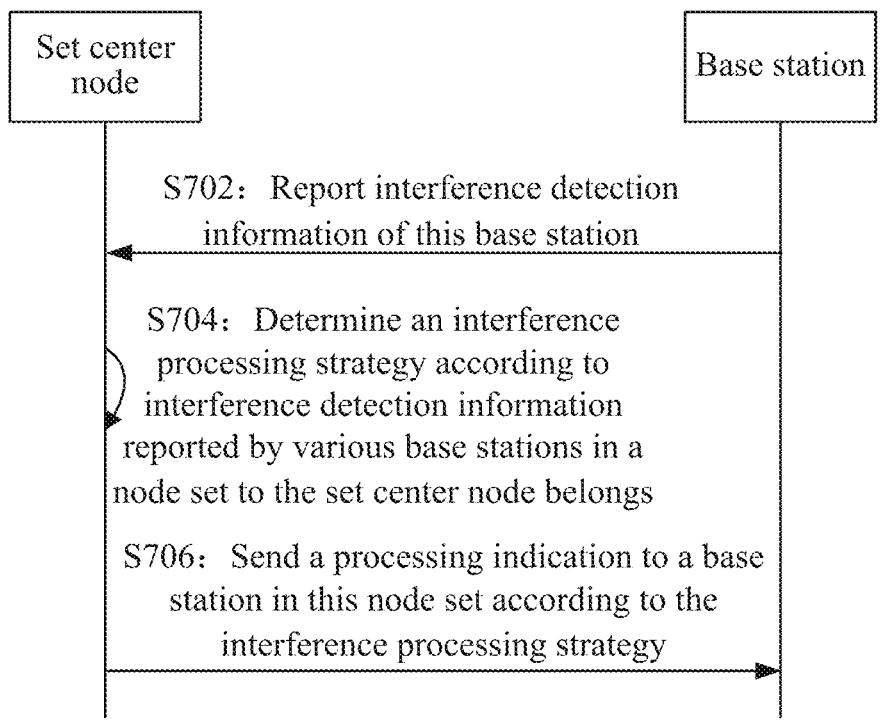
FIG. 7 is a flowchart for determining, on the basis of a joint determination result, that atmospheric waveguide interference occurs according to embodiment one of the present disclosure.

Mode 2: The victim base station determines, on the basis of a joint determination result of the victim node set, that the victim base station is currently interfered by the atmospheric waveguide. Please refer to FIG. 7.

In step S702, a base station reports interference detection information of this base station to a set center node of a node set to which the base station belongs.

It is to be understood that while the base station performs the atmospheric waveguide interference detections, a preliminary determination may be made. For example, it is preliminarily determined, according to detection results, that the base station is interfered by the atmospheric waveguide. The interference detection information may include frequency domain feature information of an interfered signal of the base station and interfered time feature information of the base station. For example, the frequency domain feature information of the interfered signal of the base station may indicate that a frequency domain feature of the interfered signal of the base station is a step fading feature. In other examples of this embodiment, the interference detection information further includes at least one of the following: frequency information of this base station, or interfered antenna information of this base station. The interfered antenna information of this base station may include an antenna direction, an antenna height and other information. In some examples, the interference detection information includes detected time feature information and detected frequency domain feature information of an interfered signal of this base station, frequency information of this base station, and interfered antenna information of this base station.

In step S704, the set center node determines an interference processing strategy according to the interference detection information reported by the base station in this node set. The set center node may acquire interference detection information reported by each base station in the node set. A final decision for the situation that this node set is interfered by the atmospheric waveguide is made by synthesizing the interference detection information. For example, the set center node determines, by comparing interference detection information reported by various base station, whether only a few base stations report interference or most base stations are interfered.

For example, if only one or two base stations report interference and interference signals have different frequency domain features, then the set center node may determine that the current interference processing strategy is mainly self-adjustment of the various base stations and allows the interfered base station to adjust power, uplink time domain resources and the like, thus avoiding the atmospheric waveguide interference.

If the number of base stations reporting interference in the node set exceeds a preset number, most of the base stations report interference and, for example, interference signals have basically same frequency domain features, then it is necessary to consider finding a far-end interference source to solve the atmospheric waveguide interference problem. In this case, the set center node may instruct some base stations or some cells of some base stations to send reference signals, so as to perform atmospheric waveguide interference control with the assistance of a corresponding aggressor base station.

In step S706, the set center node sends a processing indication to a base station in this node set of the set center node according to the interference processing strategy. No matter whether the interference processing strategy finally determined by the set center node is avoiding the atmospheric waveguide interference through self-adjustment or controlling the atmospheric waveguide interference by finding the assistance of the interference source, the set center node needs to send the processing indication to the base station of the node set. However, if the interference processing strategy determined by the set center node is the former, the processing indication sent by the set center node is a self-adjustment indication for instructing the base station or a cell of the base station to perform self-adjustment. If the interference processing strategy determined by the set center node is the latter, the processing indication sent by the set center node is a reference sending indication for instructing the base station to send the reference signal. In some examples of this embodiment, the reference sending indication includes information for indicating the reference signal. The information is used for indicating to the base station or the cell of the base station what kind of reference signal the node set sends when the node set sends the reference signal, that is, to indicate the structure content of the reference signal sent by the node set, and the like. In other examples of this embodiment, the reference sending indication further includes other information. For example, for a certain base station that needs to send a reference signal, the reference sending indication further includes indication information of a cell that belongs to the base station and needs to send the reference signal. It is to be understood that for a certain base station, there may be some cells that need to send reference signals, that is, the second interference processing strategy above is used to perform the atmospheric waveguide interference control, so the set center node needs to send a reference sending indication to the base station; however, meanwhile, the base station also has some cells that need to avoid the atmospheric waveguide interference through the first processing strategy, so the set center node sends a self-adjustment indication to the base station. In this case, both the reference sending indication and the self-adjustment indication may be sent to the base station, and a corresponding processing indication may include information for indicating a reference signal, indication information of a cell that belongs to the base station and needs to send a reference signal, and information of a cell that belongs to the base station and needs to perform communication resource adjustment.

In step S604, the victim base station determines, according to a response message sent by an aggressor node set, that the aggressor base station receives the reference signal. It is to be understood that in the aggressor node set, it is the aggressor base station that monitors the reference signal sent by the victim base station, but it may not be the aggressor base station that sends the response message to the victim node set. For example, it may be the set center node in the aggressor node set that sends the response message to the victim node set. However, in general, the response message received by the victim node set is sent by the aggressor node set.

The response message sent by the aggressor node set mainly indicates that a base station, that is, the aggressor base station, in the node set receives the reference signal sent by the victim base station. Thus, after the victim node set receives the response information sent by the aggressor node set, the victim base station may determine that the aggressor base station has received the reference signal.

If the reference signal sent by the victim base station carries a set identifier of the victim node set, then after the victim node set receives the response message from the aggressor node set, the set center node may send a reception notification to the victim base station. The reception notification is used for indicating that this node set has received the response information sent by the aggressor node set. It is to be understood that after the set center node of the victim node set receives the response message, it may not be determined which base station in this node set sends the reference signal corresponding to the response message. In this case, the set center node may notify each base station in the node set to which the set center node belongs. If an addressing identifier carried in the reference signal sent by the victim base station is an base station identifier of the victim base station, then in this case, the victim base station may determine, through the received response message sent by the aggressor node set, that the aggressor base station has monitored the reference signal sent by the victim base station. In step S606, the victim base station performs the atmospheric waveguide interference control in cooperation with the aggressor base station.

After it is determined that the aggressor base station receives the reference signal, the victim base station may continuously perform the atmospheric waveguide interference control in cooperation with the aggressor base station. In some examples of this embodiment, for the process in which the victim base station performs the atmospheric waveguide interference control in cooperation with the aggressor base station, refer to steps S108 to S114 in FIG. 1; and for the specific process, refer to the preceding description, which is not repeated here. However, in other examples of this embodiment, the victim base station does not need to follow the steps in FIG. 1. For example, after the victim base station provides assistance information to the aggressor base station, it is further monitored whether the transmission quality of an uplink of the base station is still interfered by the atmospheric waveguide. However, usually, after the victim base station determines that the aggressor base station monitors the reference signal sent by the victim base station, interference assistance information is sent to the aggressor base station.

In some examples of this embodiment, the interference assistance information sent by the victim base station to the aggressor base station includes at least one of the following: 1) frequency information of the victim base station, 2) frequency domain feature information of an interfered signal of the victim base station, 3) interfered time feature information of the victim base station, 4) interfered antenna information of the victim base station; 5) an atmospheric waveguide interference solving strategy of the victim base station, or 6) information about whether the aggressor base station interferes with the victim base station.

The interference assistance information helps the aggressor base station to determine an atmospheric waveguide interference control strategy. For example, the aggressor base station may determine, according to the interference assistance information, how to back off, thus eliminating the atmospheric waveguide interference of a downlink signal of the aggressor base station to the victim base station as much as possible.

According to the interference control method of this embodiment of the present disclosure, after the victim base station was interfered by the atmospheric waveguide, the sent reference signal carries the addressing identifier of the base station, and thus, after the aggressor base station monitors the reference signal sent by the victim base station, an aggressor node side may route a message to a victim node side on the basis of the addressing identifier, so that the victim base station may know whether the reference signal sent by the victim base station is monitored by the aggressor base station, and in the case where it is determined that the aggressor base station receives the reference signal, other processes of the atmospheric waveguide interference control, for example, sending the interference assistance information, are performed with the aggressor base station, so as to implement the atmospheric waveguide interference control, thereby avoiding the problem that the communication quality of the base station is affected for a long time and the user experience is reduced.

Embodiment Two

Figure 8:
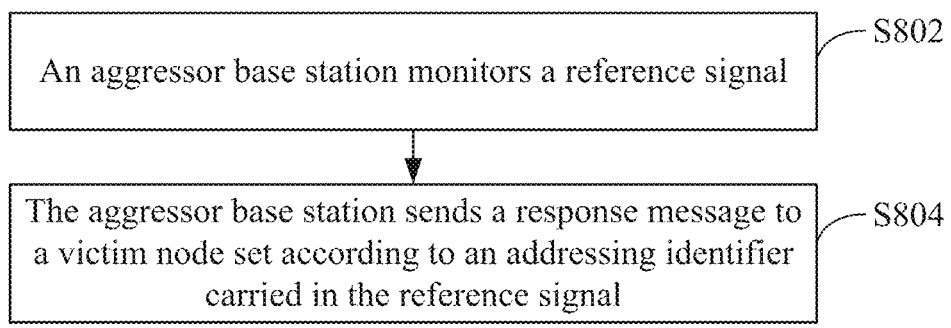
FIG. 8 is a flowchart of a response message sending method according to embodiment two of the present disclosure.

In this embodiment, the process of sending a response message at an aggressor node side in an atmospheric waveguide interference control solution is be described in conjunction with the preceding embodiments. Please refer to FIG. 8.

In step 5802, an aggressor base station monitors a reference signal.

In an example of this embodiment, after a set center node of an aggressor node set receives a message notification from a network management, a base station in the set may be instructed to monitor atmospheric waveguide interference. The aggressor base station monitors the atmospheric waveguide interference after receiving a monitoring indication from the set center node, so as to determine whether the reference signal sent by the victim base station can be monitored.

In other examples of this embodiment, each base station of the aggressor node set may monitor the reference signal without being triggered by a notification from the set center node. For example, before the victim base station sends the reference signal, monitoring trigger information may be sent first. The monitoring trigger information may trigger the base station, which receives the signal, to start the reference signal monitoring. Actually, when victim base station is interfered by the atmospheric waveguide, the victim base station cannot accurately determine which one is the aggressor base station, so only the distance and the direction of the aggressor base station relative to the victim base station can be estimated according to an interference detection result, and then, the monitoring trigger information is sent, ensuring that the monitoring trigger information can reach the estimated direction and distance and thus the aggressor base station can receive the monitoring trigger information.

In this solution where the aggressor base station performs monitoring on the reference signal after the aggressor base station is triggered through the monitoring trigger information, the orientation of the aggressor base station may be determined according to an antenna angle, historical data, a time domain feature and a frequency domain feature interfered of the victim base station, and other factors, and then, the monitoring trigger information is sent. Moreover, the victim base station needs to ensure that the monitoring trigger information cannot spread in the network indefinitely, so the victim base station may set the number of hops in the monitoring trigger information, the number of hops automatically decreases each time the monitoring trigger signal passes through a base station or a core network element. When the number of hops decreases to zero, the monitoring trigger information is no longer forwarded, so that a sending range of the monitoring trigger information is displayed. A base station receiving the monitoring trigger information may start the reference signal monitoring. If the reference signal is not monitored within a preset time after starting the monitoring, the monitoring may be stopped. If the reference signal is monitored within the preset time, step S804 also needs to be performed.

In some examples of this embodiment, the monitoring trigger information further includes at least one of several kinds of information in addition to the number of hops: 1) frequency information of the victim base station, 2) frequency domain feature information of an interfered signal of the victim base station, 3) interfered time feature information of the victim base station; 4) interfered antenna information of the victim base station, 5) an atmospheric waveguide interference solving strategy of the victim base station, 6) device information of the victim base station, such as device ID and/or IP address; 7) configuration information for sending reference information by the victim base station, such as sending time-frequency information and coding information of a reference signal.

In step S804, after the reference signal sent by the victim base station is monitored, the aggressor base station sends a response message to a victim node set according to an addressing identifier carried in the reference signal.

In some examples of this embodiment, if the aggressor base station monitors the reference signal sent by the victim base station, then the aggressor base station may acquire the addressing identifier carried in the reference signal. Since the addressing identifier corresponds to route information of the node set to which the victim base station belong, that is, the victim node set, so the aggressor base station may route a response message to the victim node set according to the addressing identifier. The function of the response message is to enable the victim base station to know that the reference signal sent by the victim base station has been monitored by the aggressor base station.

In some examples of this embodiment, after the aggressor base station monitors the reference signal sent by the victim base station, the response message is not directly sent to the victim node set. Instead, a monitoring result of the aggressor base station is sent to the set center node of the node set to which the aggressor base station belongs, that is, the aggressor node set, so that the set center node may send the response message after determining the orientation of the victim base station according to the monitoring result obtained from the base station in the aggressor node set. In some examples of this embodiment, the monitoring result reported by the aggressor base station to the set center node includes relevant information of the reference signal received by an aggressor device, for example, at least one of a frequency offset, sequence information, a time-frequency position for receiving the reference signal, or the like. In other examples of this embodiment, the monitoring result reported by the aggressor base station may further include a radio time domain resource configuration of the aggressor base station, for example, an uplink and downlink subframe configuration of a time division duplexing (TDD) system. Alternatively, the monitoring result reported by the aggressor base station may further include antenna information of the aggressor base station, such as an antenna direction and an antenna height.

In this embodiment, the aggressor base station may send the response message to the victim node set through a core network, and the core network forwards the response message to the victim node set. In this case, the following interfaces may be used in the response message transmission: 1) an S1 interface or an NG interface, and 2) an interface between core network elements, for example, an S10 interface. In other examples of this embodiment, the aggressor base station may send the response message to the victim node set by using a communication interface between base stations. In this case, the following interfaces may be used in the response message transmission: an S1 interface or an NG interface.

From the preceding description, it can be seen that the addressing identifier carried in the reference signal may be a set identifier of the victim node set. In this case, when the response message is sent, a pre-determined mapping between route information and set identifiers of various node sets may be used. In conjunction with the description of embodiment one, the mapping may be stored in a core network element, or in a network management or a server (for example, a DNS server).

In the case where the mapping is stored in the core network element, when the aggressor base station sends the response message, the set ID may be directly carried in the response message, and the response message is sent to the core network element. It is to be understood that the core network element refers to a core network element on an aggressor node set side. After the core network element receives the response message, the pre-acquired mapping may be queried about to determine the route information corresponding to the set identifier. Then, the response message is sent to the victim node set according to the route information, for example, to the corresponding set center node. There is no doubt that in this solution, the core network element on the aggressor node set side needs to pre-acquire the mapping between the route information and the set identifiers of the various node sets. At least a mapping between the route information of the victim node set and the set identifier of the victim node set needs to be acquired. It is to be understood that the mapping may be acquired from others core network elements, for example, a core network element at a victim node set side.

In the case where the mapping is stored in the network management or the server, before the aggressor base station sends the response message, the network management or the server may be queried according to the addressing identifier, so as to acquire the route information of the victim node set, and then, the response message is sent by using the route information as a destination address. For example, in an example of this embodiment, a DNS server stores a mapping between the set identifier and a base station identifier of the victim base station, a TAI of the victim base station, and public land mobile network (PLMN) information of the victim base station. Thus, the aggressor base station may acquire the base station identifier, the TAI and the PLMN information of the victim base station according to the set identifier acquired from the reference signal. Then, the aggressor base station may send the response message to the victim base station according to the three pieces of information.

In some examples of this embodiment, the set center node of the victim node set may be a core network element. In this case, the addressing identifier may further be a core network identifier of the set center node of the victim node set. The aggressor base station may acquire the core network identifier of the victim node set by monitoring the reference signal. Thus, when the response message is sent, the aggressor base station may fill in the core network identifier of the victim node set in the destination address, and then, the response message is routed to the set center node of the victim node set.

In other examples of this embodiment, the addressing identifier carried in the reference signal may further be the base station identifier of the victim base station. In this case, the core network element or the network management and server may not need to pre-store the mapping between the addressing identifiers and the route information. The aggressor base station may directly send the response message according to the addressing identifier acquired from the reference signal. The response message may be directly sent to the victim base station instead of being sent to the set center node on a victim base station side and then notified by the set center node.

Compared with the set identifier, the base station identifier makes it easier for the aggressor base station to send the response message. However, compared with the set identifier, the base station identifier occupies more bits in the reference signal. For example, a base station identifier of a 5G base station usually has 22 bits to 32 bits, a base station identifier of a 4G macro base station usually has 20 bits, a base station identifier of a 4G home base station usually has 28 bits, a base station identifier of a 4G short base station usually has 18 bits, and a base station identifier of a 4G long base station usually has 21 bits.

In an example of this embodiment, the response message sent by the aggressor base station to the victim node set may include one or more of the following content: 1) relevant information of the reference signal received by the aggressor base station, for example, at least one of a time-frequency position at which the reference signal is received, a frequency offset, sequence information, or the like; 2) a radio time domain resource configuration of the aggressor base station, for example, an uplink and downlink subframe configuration of a TDD system; 3) antenna information of the aggressor base station, such as an antenna direction and an antenna height; or 4) an atmospheric waveguide interference control strategy of the aggressor base station.

According to the response message sending method in this embodiment, the aggressor base station monitors the reference signal, after the reference signal sent by the victims base station is monitored, the response message is sent to the victim node set according to the addressing identifier carried in the reference signal, so that the victim base station knows that the aggressor base station has monitored the reference signal, and further, the atmospheric waveguide interference control is implemented in cooperation with an aggressor base station side, thereby avoiding the problem that the atmospheric waveguide interference affects the victim base station for a long time and causes poor communication quality of the victim base station.

Embodiment Three

Figure 9:
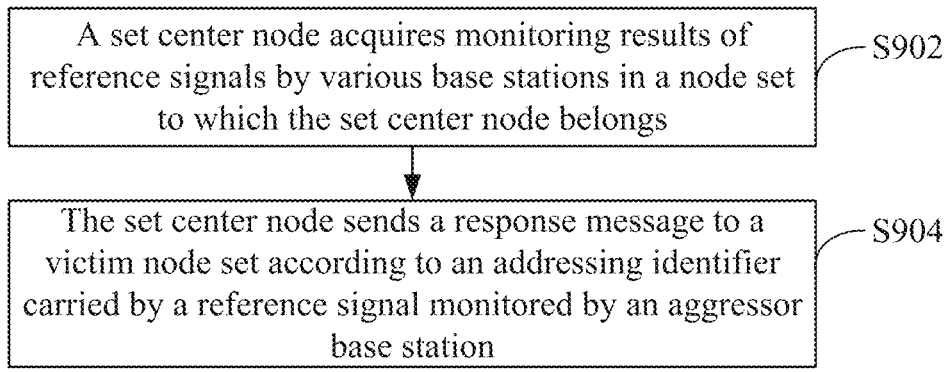
FIG. 9 is a flowchart of a response message sending method according to embodiment three of the present disclosure.

This embodiment continuously describes the process of sending a response messages at an aggressor node side in an atmospheric waveguide interference control solution in conjunction with the preceding embodiments. Different from embodiment two, the response message in this embodiment is not sent by an aggressor base station, but by a set center node of an aggressor node set. Please refer to FIG. 9.

In step S902, a set center node acquires a monitoring result of a reference signal by a base station in a node set to which the set center node belongs.

In an example of this embodiment, after the set center node of the aggressor node set receives a message notification from a network management, the base station in the set may be instructed to monitor atmospheric waveguide interference. After receiving a monitoring indication from the set center node, the aggressor base station monitors the atmospheric waveguide interference, and a monitoring result is reported to the set center node.

In other examples of this embodiment, the set center node may receive monitoring results actively reported by various base station in the node set to which the set center node belongs. In this case, the various base stations in the node set to which the set center node belongs may monitor reference signals without being triggered by the set center node. For example, before a victim base station sends the reference signal, monitoring trigger information may be sent firstly. The monitoring trigger information may trigger the base station, which receives the signal, to start the reference signal monitoring. Actually, when interfered by the atmospheric waveguide, the victim base station cannot accurately determine which one is the aggressor base station. Thus, only the distance and the direction of the aggressor base station relative to the victim base station can be estimated according to an interference detection result. Then, the monitoring trigger information is sent, ensuring that the monitoring trigger information can reach the estimated direction and distance and thus the aggressor base station can receive the monitoring trigger information.

In this solution where the aggressor base station performs monitoring on the reference signal after the aggressor base station is triggered through the monitoring trigger information, the orientation of the aggressor base station may be determined according to an antenna angle, historical data, a time domain feature and a frequency domain feature interfered of the victim base station, and other factors, and then, the monitoring trigger information is sent. Moreover, the victim base station needs to ensure that the monitoring trigger information cannot spread in the network indefinitely, so the victim base station may set the number of hops in the monitoring trigger information. The number of hops automatically decreases each time the monitoring trigger signal passes through a base station or a core network element. When the number of hops decreases to zero, the monitoring trigger information is no longer forwarded, so that a sending range of the monitoring trigger information is displayed. A base station receiving the monitoring trigger information may start the reference signal monitoring. If the reference signal is not monitored within a preset time after the start of the monitoring, the monitoring may be stopped. If the reference signal is monitored within the preset time, it is indicated that the base station is the aggressor base station, and the monitoring result may be reported to the set center node.

In some examples of this embodiment, the monitoring trigger information further includes at least one of several kinds of information in addition to the number of hops: 1) frequency information of the victim base station, 2) frequency domain feature information of an interfered signal of the victim base station, 3) interfered time feature information of the victim base station, 4) interfered antenna information of the victim base station, 5) an atmospheric waveguide interference solving strategy of the victim base station, 6) device information of the victim base station, such as a device ID and/or an IP address, and 7) configuration information for sending reference information by the victim base station, such as sending time-frequency information and coding information of a reference signal.

It is to be understood that it may be some base stations or all base stations in the aggressor node set that report the monitoring results to the set center node.

In step S904, the set center node sends a response message to the victim node set according to the addressing identifier carried by the reference signal monitored by the aggressor base station.

The set center node may send the response message to the victim node set after determining the orientation of the victim base station according to the monitoring result acquired from the base station in the aggressor node set. In some examples of this embodiment, the monitoring result reported by the aggressor base station to the set center node includes relevant information of the reference signal received by an aggressor device, for example, at least one of a frequency offset, sequence information, a time-frequency position for receiving the reference signal, or the like. In other examples of this embodiment, the monitoring result reported by the aggressor base station may further include a radio time domain resource configuration of the aggressor base station, for example, an uplink and downlink subframe configuration of a TDD system. Alternatively, the monitoring result reported by the aggressor base station may further include antenna information of the aggressor base station, such as an antenna direction and an antenna height.

In this embodiment, the set center node may send the response message to the victim node set through a core network, and the core network forwards the response message to the victim node set. In this case, the following interfaces may be used in the response message transmission: 1) an S1 interface or an NG interface, and 2) an interface between core network elements, for example, an S10 interface. In other examples of this embodiment, the set center node may send the response message to the victim node set by using a communication interface between base stations. In this case, the following interfaces may be used in the response message transmission: an S1 interface or an NG interface.

From the preceding description, the addressing identifier carried in the reference signal may be a set identifier of the victim node set. In this case, when the response message is sent, a pre-determined mapping between route information and set identifiers of various node sets may be used. In conjunction with the description of embodiment one, the mapping may be stored in a core network element, or in a network management or a server (for example, a DNS server).

In the case where the mapping is stored in the core network element, when the set center node sends the response message, the set identifier may be directly carried in the response message, and the response message may be sent to the core network element. It is to be understood that the core network element refers to a core network element on an aggressor node set side. After the core network element receives the response message, the pre-acquired mapping may be queried about to determine route information corresponding to the set identifier. Then, the response message is sent to the victim node set according to the route information, for example, to the corresponding set center node. There is no doubt that in this solution, the core network element on the aggressor node set side needs to pre-acquire the mapping between the route information and the set identifiers of the various node sets. At least a mapping between the route information of the victim node set and the set identifier of the victim node set needs to be acquired. It is to be understood that the mapping may be acquired from others core network elements, for example, a core network element at a victim node set side.

In the case where the mapping is stored in the network management or the server, before the set center node sends the response message, the network management or the server may be queried according to the addressing identifier, so as to acquire the route information of the victim node set. Then, the response message is sent by using the route information as a destination address. For example, in an example of this embodiment, the DNS server stores a mapping between the set identifier and a base station identifier of the victim base station, a TAI of the victim base station, and public land mobile network (PLMN) information of the victim base station. Thus, the set center node may acquire the base station identifier, the TAI and the PLMN information of the victim base station according to the set identifier acquired from the reference signal. Then, the set center node may send the response message to the victim base station according to the three pieces of information.

In some examples of this embodiment, the set center node of the victim node set may be a core network element. In this case, the addressing identifier may further be a core network identifier of the set center node of the victim node set. For the set center node of the aggressor node set, the core network identifier of the victim node set may be acquired by monitoring the reference signal by the aggressor base station. Thus, when the response message is sent, the set center node may fill in the core network identifier of the victim node set in the destination address, and then, the response message is routed to the set center node of the victim node set.

In other examples of this embodiment, the addressing identifier carried in the reference signal may further be the base station identifier of the victim base station. In this case, the core network element or the network management and server may not need to pre-store the mapping between the addressing identifier and the route information. The set center node may directly send the response message according to the addressing identifier acquired from the reference signal. The response message may be directly sent to the victim base station instead of being sent to the set center node on a victim base station side and then notified by the set center node. Compared with the set identifier, the base station identifier can make it easier for the set center node to send the response message. However, compared with the set identifier, the base station identifier occupies more bits in the reference signal. For example, a base station identifier of a 5G base station usually has 22 bits to 32 bits, a base station identifier of a 4G macro base station usually has 20 bits, a base station identifier of a 4G home base station usually has 28 bits, a base station identifier of a 4G short base station usually has 18 bits, and a base station identifier of a 4G long base station usually has 21 bits.

In an example of this embodiment, the response message sent by the set center node to the victim node set may include one or more of the following content: 1) relevant information of the reference signal received by the aggressor base station, for example, at least one of a time-frequency position at which the reference signal is received, a frequency offset, sequence information, or the like; 2) a radio time domain resource configuration of the aggressor base station, for example, an uplink and downlink subframe configuration of a TDD system; 3) antenna information of the aggressor base station, such as an antenna direction and an antenna height; or 4) an atmospheric waveguide interference control strategy of the aggressor base station.

According to the response message sending method in this embodiment, the aggressor base station monitors the reference signal, after the reference signal sent by the victims base station is monitored, the set center node of the aggressor node set sends the response message to the victim node set according to the addressing identifier carried in the reference signal, so that the victim base station knows that the aggressor base station has monitored the reference signal, and further, the atmospheric waveguide interference control is implemented in cooperation with an aggressor base station side, thereby avoiding the problem that the atmospheric waveguide interference affects the victim base station for a long time and causes poor communication quality of the victim base station.

Embodiment Four

Figure 10:
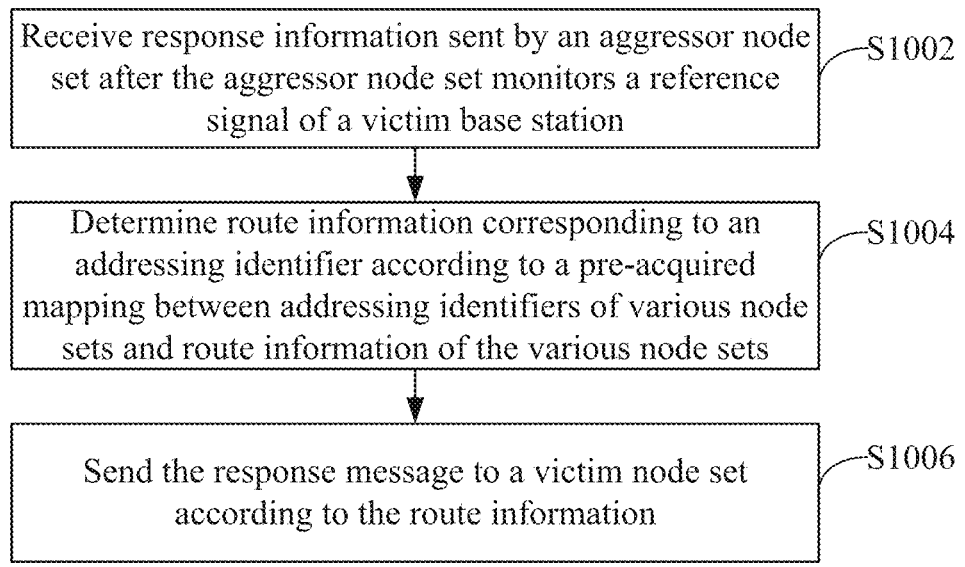
FIG. 10 is a flowchart of a response message forwarding method according to embodiment four of the present disclosure.

In preceding embodiments two and three, when an aggressor base station or a set center node of an aggressor node set sends a response message, an addressing identifier is carried directly in the response message, and then, a core network element routes a response message to a victim node set according to a mapping. That is, a solution for forwarding the response message by the core network element when the mapping between route information and addressing identifiers of node sets is stored in the core network element is described below. Please refer to the flowchart of the response message forwarding method shown in FIG. 10.

In step S1002, a core network element receives response information sent by an aggressor node set after the aggressor node set monitors a reference signal of a victim base station.

In this embodiment, in the case where the mapping is stored in the core network element, when the aggressor node set sends a response message, a set identifier may be directly stored in the response message, and the response message is sent to the core network element. It is to be understood that the core network element refers to a core network element at an aggressor node set side. It may be an aggressor base station or a set center node of the aggressor node set that sends the response message.

In step S1004, the core network element determines route information corresponding to the addressing identifier of the victim node set according to a pre-acquired mapping between addressing identifiers of various node sets and route information of the various node sets. After the core network element receives the response message, the pre-acquired mapping may be queried about to determine the route information corresponding to the set identifier. Then, the response message is sent to the victim node set according to the route information. For example, in the case where the addressing identifier is the set identifier, the core network element may send the response message to the corresponding set center node.

There is no doubt that in this solution, the core network element on the aggressor node set side needs to pre-acquire the mapping between the route information and the set identifiers of the various node sets. At least a mapping between the route information of the victim node set and the set identifier of the victim node set needs to be acquired. It is to be understood that the mapping may be acquired from others core network elements, for example, a core network element at a victim node set side.

In an example of this embodiment, for any node set, if a set center node is a core network element, the set center node may determine route information corresponding to the node set according to base station identifiers reported by various base stations in the node set. It is to be understood that the set center node may select route information of any base station in the node set as the route information of the node set, and the route information of the set center node may be used as the route information of the node set. On this basis, the core network element may determine a mapping between the route information and an addressing identifier of the node set. Then, the core network element and other core network elements may communicate acquired mappings between route information and addressing identifiers of node sets with each other. In this way, various core network elements may acquire the mappings between the various core network elements.

In another example of this embodiment, if the set center node is not the core network element, the set center node needs to report the mapping between the route information and the addressing identifier of this node set to a core network element connected to the set center node. The core network element performs mapping interactions with other core network elements to acquire mappings of node sets of various core network elements.

In step S1006, the core network element sends the response message to the victim node set according to the route information.

After the core network element determines the route information corresponding to the addressing identifier of the victim node set according to the pre-acquired mapping between the addressing identifiers of the various node sets and the route information of the various node sets, the response message may be forwarded to the victim node according to the route information. It may be understood that since the addressing identifier of the victim node set in the core network element may correspond to route information of a certain base station in the victim node set, the core network element may send the response message to the base station, and then, the base station reports the reception of the response message to the set center node.

Additionally, the addressing identifier of the victim node set in the core network element may correspond to the route information of the set center node of the victim node set. In this case, the core network element may send the response message to the set center node of the victim node set according to the route information.

According to the response message forwarding method of this embodiment, the mapping between the addressing identifiers of the various node sets and the route information of the various node sets is pre-stored in the core network element, so that after the aggressor base station monitors the reference signal sent by the victim base station, the aggressor node set may feed back the response message to the victim base station via the core network element.

Additionally, the response message is sent by the node set, so that when the victim base station sends the reference signal, only the set identifier needs to be carried in the reference signal. Compared with a base station identifier, the set identifier is simpler so that the number of bits occupied by the addressing identifier in the reference signal can be reduced.

Embodiment Five

Figure 11:
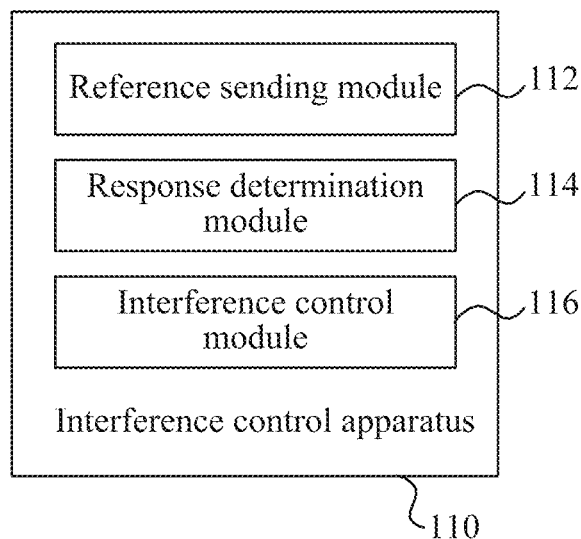
FIG. 11 is a structural diagram of an interference control apparatus according to embodiment five of the present disclosure.

This embodiment provides an interference control apparatus. Referring to FIG. 11, the interference control apparatus 110 includes a reference sending module 112, a response determination module 114 and an interference control module 116. The reference sending module 112 is configured to send a reference signal carrying an addressing identifier. The response determination module 114 is configured to determine, according to a response message sent by an aggressor node set, that an aggressor base station receives the reference signal. The interference control module 116 is configured to perform atmospheric waveguide interference control in cooperation with the aggressor base station.

In this embodiment, the interference control apparatus 110 may be deployed on a victim base station of a victim node set. The victim base station may refer to a complete base station or a DU device in the base station, or may refer to a cell in the base station. The functions of the reference sending module 112, the response determination module 114 and the interference control module 116 in the interference control apparatus 110 may each be jointly implemented by a processor and a communication apparatus of the base station.

In this embodiment, when the reference sending module 112 determines that there is currently atmospheric waveguide interference affecting the inference control apparatus 110, the reference signal may be sent. The reference signal carries an addressing identifier corresponding to route information of the victim base station. The addressing identifier can enable the aggressor base station monitoring and receiving the reference signal to have an opportunity to send a response message to the victim node set.

In some examples of this embodiment, the addressing identifier may be a set identifier of the victim node set. In this case, a core network element may be pre-notified of correspondence between the set identifier of the victim node set and route information of the victim node set. When the aggressor base station or the aggressor node set needs to send a response message according to the reference signal, the aggressor base station or the aggressor node set may at least send the response message to the victim node set with the help of the core network element. For example, in an example of this embodiment, if the route information of the victim node set is route information of a set center node, the response message may be sent to the set center node in the victim node set, so that the set center node of the victim node set may notify the victim base station of the information that the aggressor node set sends the response message. In other examples of this embodiment, the route information of the victim node set may refer to route information of a certain base station in the node set.

In other examples, the correspondence between the set identifier of the victim node set and the route information of the victim node set may be stored in a network management or a DNS server. In this way, when needing to send the response message, the aggressor node set may at least acquire the route information of the victim node set according to the correspondence stored in the network management or the DNS server, so that the response message corresponding to the reference signal is sent to the victim node set, for example, to the set center node of the victim node set, and then, the set center node notifies the victim base station that the aggressor base station sends the response message.

It is to be understood that in some examples of this embodiment, when the set center node of the node set is the core network element, the addressing identifier may be a core network identifier of the core network.

In other examples of this embodiment, the addressing identifier carried in the reference signal may be relevant information of the victim base station, for example, may be directly a base station identifier of the victim base station. In this case, after the aggressor node set receives the reference signal, the response message may be directly sent to the victim base station according to the base station identifier in the reference signal.

In some examples of this embodiment, the information carried in the reference signal is not limited to the addressing identifier. For example, in some examples, the reference signal may further include at least one of the following pieces of information: 1) an addressing type; 2) an IP address of the victim base station; 3) a cell identifier of an interfered cell; 4) a tracking area identity (TAI) of an interfered cell; 5) a TAI of the victim base station; 6) a TAI of the node set to which the victim base station belongs, or an operator network to which an interfered cell pertains; 7) an operator network to which the victim base station pertains; or 8) an operator network to which the node set to which the victim base station belongs pertains, that is, an operator network to which the victim node set pertains.

The reference sending module 112 sends the reference signal after determining that the victim base station is currently affected by the atmospheric waveguide interference. To determine whether the victim base station is affected by the atmospheric waveguide interference, this embodiment provides the two determination modes described below. The interference control apparatus 110 may determine in at least one of the two modes.

Mode 1: The interference control apparatus 110 determines, on the basis of an independent interference detection result of a base station, that the base station is currently interfered by an atmospheric waveguide.

It is to be understood that the base station cannot be referred to as the victim base station until the base station determines that the base station is interfered by the atmospheric waveguide.

However, a base station that has been determined as the victim base station will definitely perform atmospheric waveguide interference detections. In mode 1, the base station, including the base station that later determined as the victim base station, may independently determine whether the base station is currently interfered by the atmospheric waveguide. For example, the interference control apparatus 110 determines, by measuring an uplink signal in a cell of the base station, whether an atmospheric waveguide interference phenomenon occurs. Mode 2: The interference control apparatus 110 determines, on the basis of a joint determination result of the victim node set, that the base station is currently interfered by the atmospheric waveguide.

For a node set, a base station in the node set may report interference detection information of the base station to a set center node, and then, the set center node determines an interference processing strategy according to interference detection information reported by various base stations in the node set.

It is to be understood that when the base station detects the atmospheric waveguide interference, a preliminary determination may be made. For example, it is preliminary determined, according to detection results, that the base station is interfered by the atmospheric waveguide. The interference detection information may include frequency domain feature information of an interfered signal of the base station, and interfered time feature information of the base station. For example, the frequency domain feature information of the interfered signal of the base station may indicate that a frequency domain feature of the interfered signal of the base station is a step fading feature. In other examples of this embodiment, the interference detection information further includes at least one of the following: frequency information of this base station, or interfered antenna information of this base station. The interfered antenna information of this base station may include an antenna direction, an antenna height and other information. In some examples, the interference detection information includes all of detected time feature information and detected frequency domain feature information of an interfered signal of this base station, frequency information of this base station, and interfered antenna information of this base station.

The set center node may acquire interference detection information reported by various base stations in the node set. A final decision for the situation that this node set is interfered by the atmospheric waveguide is made by synthesizing the interference detection information. For example, the set center node determines, by comparing the interference detection information reported by the various base stations, whether only a few base stations report interference or most base stations are interfered.

For example, if only one or two base stations report interference and interference signals have different frequency domain features, then the set center node may determine that the current interference processing strategy is mainly self-adjustment of the various base stations and allows the interfered base station to adjust power, uplink time domain resources and the like, thus avoiding the atmospheric waveguide interference.

If the number of base stations reporting interference in the node set exceeds a preset number, most of the base stations report interference and, for example, interference signals have basically same frequency domain features, then it is necessary to consider finding a far-end interference source to solve the atmospheric waveguide interference problem. In this case, the set center node may instruct some base stations or some cells of some base stations to send reference signals, so as to perform atmospheric waveguide interference control with the assistance of a corresponding aggressor base station.

No matter whether the interference processing strategy finally determined by the set center node is avoiding the atmospheric waveguide interference through the self-adjustment or controlling the atmospheric waveguide interference by finding the assistance of the interference source, the set center node needs to send a processing indication to the base station of the node set. However, if the interference processing strategy determined by the set center node is the former, the processing indication sent by the set center node is a self-adjustment indication for instructing the base station or a cell of the base station to perform self-adjustment. If the interference processing strategy determined by the set center node is the latter, the processing indication sent by the set center node is a reference sending indication for instructing the base station to send the reference signal.

In some examples of this embodiment, the reference sending indication includes information for indicating the reference signal. The information is used for indicating to the base station or the cell of the base station what kind of reference signal the node set sends when the node set sends the reference signal, that is, to indicate the structure content of the reference signal sent by the node set, and the like. In other examples of this embodiment, the reference sending indication further includes other information. For example, for a certain base station that needs to send a reference signal, the reference sending indication further includes indication information of a cell that belongs to the base station and needs to send the reference signal.

It is to be understood that a certain base station may have some cells that need to send reference signals, that is, the second interference processing strategy above is used to perform the atmospheric waveguide interference control, so the set center node needs to send a reference sending indication to the base station; however, meanwhile, the base station further has some cells that need to avoid the atmospheric waveguide interference through the first processing strategy, so the set center node sends a self-adjustment indication to the base station. In this case, both the reference sending indication and the self-adjustment indication may be sent to the base station, and a corresponding processing indication may include information for indicating a reference signal, indication information of a cell that belongs to the base station and needs to send a reference signal, and information of a cell that belongs to the base station and needs to perform communication resource adjustment.

It is to be understood that in the aggressor node set, it is the aggressor base station that monitors the reference signal sent by the victim base station, but it may not be the aggressor base station that sends a response message to the victim node set. For example, it may be the set center node in the aggressor node set that sends the response message to the victim node set. However, in general, the response message received by the victim node set is sent by the aggressor node set.

The response message sent by the aggressor node set mainly indicates that a base station in the node set, that is, the aggressor base station, receives the reference signal sent by the reference sending module 112. Thus, after the victim node set receives the response information sent by the aggressor node set, the response determination module 114 may determine that the aggressor base station has received the reference signal.

If the reference signal sent by the reference sending module 112 carries a set identifier of the victim node set, then after the victim node set receives the response message from the aggressor node set, the set center node may send a reception notification to the interference control apparatus 110. The reception notification is used for indicating that this node set has received the response information sent by the aggressor node set. It is to be understood that after the set center node of this victim node set receives the response message, it may not be determined which base station in this node set sends the reference signal corresponding to the response message. In this case, the set center node may notify each base station in the node set to which the set center node belongs.

If an addressing identifier carried in the reference signal sent by the reference sending module 112 is an base station identifier of the reference sending module 112, then in this case, the response determination module 114 may determine, through the received response message sent by the aggressor node set, that the aggressor base station has monitored the reference signal sent by the response determination module 114.

After the response determination module 114 determines that the aggressor base station receives the reference signal, the interference control module 116 may perform the atmospheric waveguide interference control next in cooperation with the aggressor base station. In some examples of this embodiment, for the process in which the victim base station performs the atmospheric waveguide interference control in cooperation with the aggressor base station, refer to steps S108 to S114 in FIG. 1; and for the specific process, please refer to the preceding description, which is not repeated here. However, in other examples of this embodiment, the interference control module 116 does not need to follow the steps in FIG. 1. For example, after the interference control module 116 provides assistance information to the aggressor base station, it is further monitored whether the transmission quality of an uplink of the base station is still interfered by the atmospheric waveguide. However, usually, after the interference control module 116 determines that the aggressor base station monitors the reference signal sent by the interference control module 116, interference assistance information is sent to the aggressor base station.

In some examples of this embodiment, the interference assistance information sent by the interference control module 116 to the aggressor base station includes at least one of the following: 1) frequency information of the victim base station, 2) frequency domain feature information of an interfered signal of the victim base station, 3) interfered time feature information of the victim base station, 4) interfered antenna information of the victim base station, 5) an atmospheric waveguide interference solving strategy of the victim base station, or 6) information about whether the aggressor base station interferes with the victim base station.

The interference assistance information helps the aggressor base station to determine an atmospheric waveguide interference control strategy. For example, the aggressor base station may determine, according to the interference assistance information, how to back off, thus eliminating the atmospheric waveguide interference of a downlink signal of the aggressor base station to the victim base station as much as possible.

According to the interference control apparatus of this embodiment of the present disclosure, after the victim base station was interfered by the atmospheric waveguide, the reference signal sent by the interference control apparatus carries the addressing identifier of the base station, and thus, after the aggressor base station monitors the reference signal sent by the reference control apparatus, an aggressor node side may route a message to a victim node side on the basis of the addressing identifier, so that the interference control apparatus may know whether the reference signal sent by the interference control apparatus is monitored by the aggressor base station, and in the case where it is determined that the aggressor base station receives the reference signal, other processes of the atmospheric waveguide interference control, for example, sending the interference assistance information, are performed with the aggressor base station, so as to implement the atmospheric waveguide interference control, thereby avoiding the problem that the communication quality of the base station is affected for a long time and the user experience is reduced.

Embodiment Six

Figure 12:
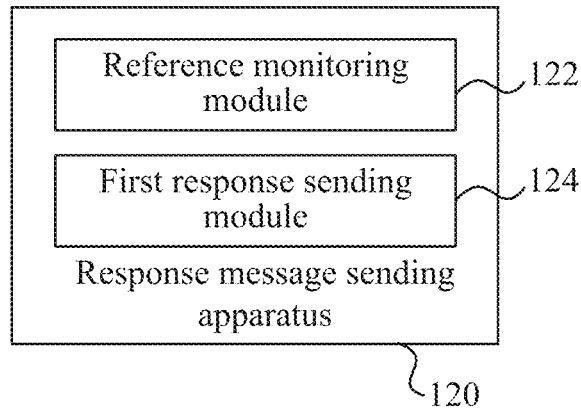
FIG. 12 is a structural diagram of a response message sending apparatus according to embodiment six of the present disclosure.

This embodiment provides a response message sending apparatus. Referring to FIG. 12, the response message sending apparatus 120 includes a reference monitoring module 122 and a first response sending module 124. The reference monitoring module 122 is configured to monitor a reference signal. The first response sending module 124 is configured to send, after monitoring the reference signal sent by a victim base station, a response message to a victim node set according to an addressing identifier carried in the reference signal.

In this embodiment, the response message sending apparatus 120 may be deployed on an aggressor base station of an aggressor node set. The aggressor base station may refer to a complete base station or a DU device in a base station. The functions of the reference monitoring module 122 and the first response sending module 124 in the response message sending apparatus 120 may each be jointly implemented by a processor and a communication apparatus of the base station.

In an example of this embodiment, after a set center node of the aggressor node set receives a message notification from a network management, a base station in the set may be instructed to monitor atmospheric waveguide interference. The reference monitoring module 122 monitors the atmospheric waveguide interference after receiving a monitoring indication from the set center node, so as to determine whether the reference signal sent by the victim base station can be monitored.

In other examples of this embodiment, each base station of the aggressor node set may monitor the reference signal without being triggered by a notification from the set center node. For example, before the victim base station sends the reference signal, monitoring trigger information may be sent firstly. The monitoring trigger information may trigger the base station, which receives the signal, to start the reference signal monitoring. Actually, when interfered by the atmospheric waveguide, the victim base station cannot accurately determine which one is the aggressor base station. Thus, only the distance and the direction of the aggressor base station with respect to the victim base station can be estimated according to an interference detection result. Then, the monitoring trigger information is sent, and it is ensured that the monitoring trigger information can reach the estimated direction and distance and thus the reference monitoring module 122 of the response message sending apparatus 120 deployed on the aggressor base station can receive the monitoring trigger information.

In this solution where the reference monitoring module 122 is triggered, by monitoring the trigger information, to monitor the reference signal, before the victim base station sends the monitoring trigger information, the orientation of the aggressor base station may be determined according to an antenna angle, historical data, a time domain feature and a frequency domain feature interfered of the reference monitoring module 122, and other factors, and then, the monitoring trigger information is sent. Moreover, the victim base station needs to ensure that the monitoring trigger information cannot spread in the network indefinitely, so the victim base station may set the number of hops in the monitoring trigger information. The number of hops automatically decreases each time the monitoring trigger signal passes through a base station or a core network element. When the number of hops decreases to zero, the monitoring trigger information is no longer forwarded, thus reaching a sending range of displaying the monitoring trigger information. A base station receiving the monitoring trigger information may start the reference signal monitoring. If the reference signal is not monitored within a preset time after the start of the monitoring, the monitoring may be stopped.

In some examples of this embodiment, the monitoring trigger information further includes at least one of several kinds of information in addition to the number of hops:

1) frequency information of the victim base station; 2) frequency domain feature information of an interfered signal of the victim base station; 3) interfered time feature information of the victim base station; 4) interfered antenna information of the victim base station; 5) an atmospheric waveguide interference solving strategy of the victim base station; 6) device information of the victim base station, such as a device ID and/or an IP address; and 7) configuration information for sending reference information by the victim base station, such as sending time-frequency information and coding information of a reference signal.

In some examples of this embodiment, if the reference monitoring module 122 monitors the reference signal sent by the victim base station, then the first response module 124 may acquire the addressing identifier carried in the reference signal. Since the addressing identifier corresponds to corresponds to route information of the node set to which the victim base station belong, that is, the victim node set, so the first response sending module 124 may route a response message to the victim node set according to the addressing identifier. The function of the response message is to enable the victim base station to know that the reference signal sent by the victim base station has been monitored by the aggressor base station.

In some examples of this embodiment, when the reference monitoring module 122 monitors the reference signal sent by the victim base station, the response message sending apparatus 120 does not directly send the response message to the victim node set. Instead, a monitoring result of the reference monitoring module 122 is sent to the node set to which the aggressor base station belongs, that is, the set center node of the aggressor node set, so that the set center node may send the response message after determining the orientation of the victim base station according to the monitoring result obtained from the base station in the aggressor node set. In some examples of this embodiment, the monitoring result reported by the response message sending apparatus 120 to the set center node includes relevant information of the reference signal received by an aggressor device, for example, at least one of a frequency offset, sequence information, a time-frequency position for receiving the reference signal, or the like. In other examples of this embodiment, the monitoring result reported by the response message sending apparatus 120 may further include a radio time domain resource configuration of the aggressor base station, for example, an uplink and downlink subframe configuration of a TDD system. Alternatively, the monitoring result reported by the aggressor base station may further include antenna information of the aggressor base station, such as an antenna direction and an antenna height.

In this embodiment, the first response sending module 124 may send the response message to the victim node set through a core network, and the core network forwards the response message to the victim node set. In this case, the following interfaces may be used in the response message transmission: 1) an S1 interface or an NG interface, and 2) an interface between core network elements, for example, an S10 interface. In other examples of this embodiment, the first response sending module 124 may send the response message to the victim node set by using a communication interface between base stations. In this case, the following interfaces may be used in the response message transmission: an S1 interface or an NG interface.

From the preceding description, it can be seen that the addressing identifier carried in the reference signal may be a set identifier of the victim node set. In this case, when the response message is sent, a pre-determined mapping between route information and set identifiers of various node sets may be used. In conjunction with the description of embodiment one, the mapping may be stored in a core network element, or in a network management or a server (for example, a DNS server).

In the case where the mapping is stored in the core network element, when the first response sending module 124 sends the response message, the set identifier may be directly carried in the response message, and the response message is sent to the core network element. It is to be understood that the core network element refers to a core network element on an aggressor node set side. After the core network element receives the response message, the pre-acquired mapping may be queried about to determine route information corresponding to the set identifier. Then, the response message is sent to the victim node set according to the route information, for example, to the corresponding set center node. There is no doubt that in this solution, the core network element on the aggressor node set side needs to pre-acquire the mapping between the route information and the set identifiers of the various node sets. At least a mapping between the route information of the victim node set and the set identifier of the victim node set needs to be acquired. It is to be understood that the mapping may be acquired from others core network elements, for example, a core network element at a victim node set side.

In the case where the mapping is stored in the network management or the server, before the first response sending module 124 sends the response message, the network management or the server may be queried according to the addressing identifier, so as to acquire the route information of the victim node set, and then, the response message is sent by using the route information as a destination address. For example, in an example of this embodiment, the DNS server stores a mapping between the set identifier and a base station identifier of the victim base station, a TAI of the victim base station and public land mobile network (PLMN) information of the victim base station. Thus, the first response sending module 124 may acquire the base station identifier, the TAI and the PLMN information of the victim base station according to the set identifier acquired from the reference signal. Then, the first response sending module 124 may send the response message to the victim base station according to the three pieces of information.

In some examples of this embodiment, the set center node of the victim node set may be a core network element. In this case, the addressing identifier may further be a core network identifier of the set center node of the victim node set. The response message sending apparatus 120 may acquire a core network identifier of the victim node set by monitoring the reference signal. Thus, when sending the response message, the first response sending module 124 can fill in the core network identifier of the victim node set in the destination address, thereby routing the response message to the set center node of the victim node set.

In other examples of this embodiment, the addressing identifier carried in the reference signal may further be the base station identifier of the victim base station. In this case, the core network element or the network management and server may not need to pre-store the mapping between the addressing identifier and the route information. The first response sending module 124 may directly send the response message according to the addressing identifier acquired from the reference signal. The response message may be directly sent to the victim base station instead of being sent to the set center node on a victim base station side and then notified by the set center node.

Compared with the set identifier, the base station identifier can make it easier for the first response sending module 124 to send the response message. However, compared with the set identifier, the base station identifier occupies more bits in the reference signal. For example, a base station identifier of a 5G base station usually has 22 bits to 32 bits, a base station identifier of a 4G macro base station usually has 20 bits, a base station identifier of a 4G home base station usually has 28 bits, a base station identifier of a 4G short base station usually has 18 bits, and a base station identifier of a 4G long base station usually has 21 bits.

In an example of this embodiment, the response message sent by the first response sending module 124 to the victim node set may include one or more of the following content: 1) relevant information of the reference signal received by the aggressor base station, for example, at least one of a frequency offset, sequence information, a time-frequency position for receiving the reference signal, or the like; 2) a radio time domain resource configuration of the aggressor base station, for example, an uplink and downlink subframe configuration of a TDD system. 3) antenna information of the aggressor base station, such as an antenna direction and an antenna height; or 4) an atmospheric waveguide interference control strategy of the aggressor base station.

According to the response message sending apparatus in this embodiment, the reference signal is monitored, after the reference signal sent by the victims base station is monitored, the response message is sent to the victim node set according to the addressing identifier carried in the reference signal, so that the victim base station knows that the aggressor base station has monitored the reference signal, and further, the atmospheric waveguide interference control is implemented in cooperation with an aggressor base station side, thereby avoiding the problem that the atmospheric waveguide interference affects the victim base station for a long time and causes poor communication quality of the victim base station.

Embodiment Seven

Figure 13:
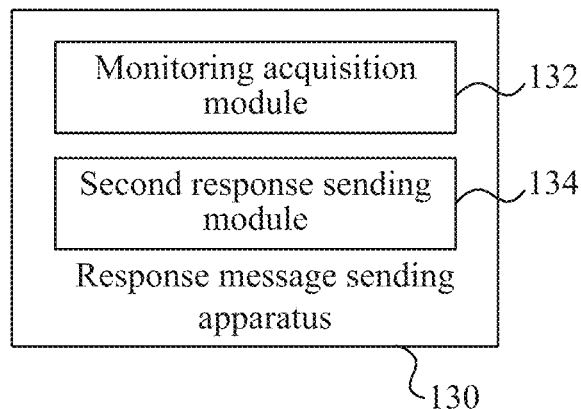
FIG. 13 is a structural diagram of a response message sending apparatus according to embodiment seven of the present disclosure.

This embodiment provides a response message sending apparatus. Referring to FIG. 13, the response message sending apparatus 130 includes a monitoring acquisition module 132 and a second response sending module 134. The monitoring acquisition module 132 is configured to acquire a monitoring result of a reference signal by a base station belonging to a set center node of an aggressor node set. The response sending module 134 is configured to send a response message to a victim node set according to the addressing identifier carried by the reference signal monitored by an aggressor base station.

In this embodiment, the response message sending apparatus 130 may be deployed on the set center node of the aggressor node set. The set center node may refer to a base station or a core network element. In some examples of this embodiment, the set center node may refer to a CU device. The functions of the monitoring acquisition module 132 and the second response sending module 134 in the response message sending apparatus 130 may each be jointly implemented by a processor and a communication apparatus of the set center node.

In an example of this embodiment, after the set center node of the aggressor node set receives a message notification from a network management, a base station in the set may be instructed to monitor atmospheric waveguide interference. After receiving a monitoring indication from the set center node, the aggressor base station monitors the atmospheric waveguide interference, and a monitoring result is reported to the monitoring acquisition module 132 of the response message sending apparatus 130.

In other examples of this embodiment, the monitoring acquisition module 132 may receive monitoring results actively reported by base stations in the node set to which the monitoring acquisition module 132 belongs. It is to be understood that it may be some base stations or all base stations in the aggressor node set that report the monitoring results to the monitoring acquisition module 132.

In the case where the monitoring result is actively reported by the base station, each base station in the node set to which the set center node belongs may monitor the reference signal without being triggered by the set center node. For example, before a victim base station sends the reference signal, monitoring trigger information may be sent firstly. The monitoring trigger information may trigger the base station, which receives the signal, to start the reference signal monitoring. Actually, when interfered by the atmospheric waveguide, the victim base station cannot accurately determine which one is the aggressor base station. Thus, only the distance and the direction of the aggressor base station with respect to the victim base station can be estimated according to an interference detection result. Then, the monitoring trigger information is sent, ensuring that the monitoring trigger information can reach the estimated direction and distance and thus the aggressor base station can receive the monitoring trigger information. In this solution where the aggressor base station performs monitoring on the reference signal after the aggressor base station is triggered through the monitoring trigger information, before the victim base station sends the monitoring trigger information, the orientation of the aggressor base station may be determined according to an antenna angle, historical data, a time domain feature and a frequency domain feature interfered of the victim base station, and other factors, and then, the monitoring trigger information is sent. Moreover, the victim base station needs to ensure that the monitoring trigger information cannot spread in the network indefinitely, so the victim base station may set the number of hops in the monitoring trigger information. The number of hops automatically decreases each time the monitoring trigger signal passes through a base station or a core network element. When the number of hops decreases to zero, the monitoring trigger information is no longer forwarded, thus reaching a sending range of displaying the monitoring trigger information. A base station receiving the monitoring trigger information may start the reference signal monitoring. If the reference signal is not monitored within a preset time after the start of the monitoring, the monitoring may be stopped. If the reference signal is monitored within the preset time, it is indicated that the base station is the aggressor base station, and the monitoring result of the base station may be reported to the monitoring acquisition module 132.

In some examples of this embodiment, the monitoring trigger information further includes at least one of several kinds of information in addition to the number of hops: 1) frequency information of the victim base station; 2) frequency domain feature information of an interfered signal of the victim base station; 3) interfered time feature information of the victim base station; 4) interfered antenna information of the victim base station; 5) an atmospheric waveguide interference solving strategy of the victim base station; 6) device information of the victim base station, such as a device identifier (ID) and/or an IP address; and 7) configuration information for sending reference information by the victim base station, such as sending time-frequency information and coding information of a reference signal.

The second response sending module 134 may send the response message to the victim node set after determining the orientation of the victim base station according to the monitoring result obtained from the base station in the aggressor node set. In some examples of this embodiment, the monitoring result reported by the aggressor base station to the monitoring acquisition module 132 includes relevant information of the reference signal received by an aggressor device, for example, at least one of a frequency offset, sequence information, or a time-frequency position and the like for receiving the reference signal. In other examples of this embodiment, the monitoring result reported by the aggressor base station may further include a radio time domain resource configuration of the aggressor base station, for example, an uplink and downlink subframe configuration of a TDD system. Alternatively, the monitoring result reported by the aggressor base station may further include antenna information of the aggressor base station, such as an antenna direction and an antenna height.

In this embodiment, the second response sending module 134 may send the response message to the victim node set through a core network, and the core network forwards the response message to the victim node set. In this case, the following interfaces may be used in the response message transmission: 1) an S1 interface or an NG interface, and 2) an interface between core network elements, for example, an S10 interface. In other examples of this embodiment, the second response sending module 134 may send the response message to the victim node set by using a communication interface between base stations. In this case, the following interfaces may be used in the response message transmission: an S1 interface or an NG interface.

From the preceding description, the addressing identifier carried in the reference signal may be a set identifier of the victim node set. In this case, when the response message is sent, a pre-determined mapping between route information and set identifiers of various node sets may be used. In conjunction with the description of embodiment one, the mapping may be stored in a core network element, or in a network management or a server (for example, a DNS server).

In the case where the mapping is stored in the core network element, when the second response sending module 134 sends the response message, the set identifier may be directly carried in the response message, and the response message is sent to the core network element. It is to be understood that the core network element refers to a core network element on an aggressor node set side. After the core network element receives the response message, the pre-acquired mapping may be queried about to determine route information corresponding to the set identifier. Then, the response message is sent to the victim node set according to the route information, for example, to the corresponding set center node. There is no doubt that in this solution, the core network element on the aggressor node set side needs to pre-acquire the mapping between the route information and the set identifiers of the various node sets. At least a mapping between the route information of the victim node set and the set identifier of the victim node set needs to be acquired. It is to be understood that the mapping may be acquired from others core network elements, for example, a core network element at a victim node set side.

In the case where the mapping is stored in the network management or the server, before the second response sending module 134 sends the response message, the network management or the server may be queried according to the addressing identifier, so as to acquire the route information of the victim node set, and then, the response message is sent by using the route information as a destination address. For example, in an example of this embodiment, the DNS server stores a mapping between the set identifier and a base station identifier of the victim base station, a TAI of the victim base station and public land mobile network (PLMN) information of the victim base station. Thus, the second response sending module 134 may acquire the base station identifier, the TAI and the PLMN information of the victim base station according to the set identifier acquired from the reference signal. Then, the second response sending module 134 may send the response message to the victim base station according to the three pieces of information.

In some examples of this embodiment, the set center node of the victim node set may be a core network element. In this case, the addressing identifier may further be a core network identifier of the set center node of the victim node set. For the set center node of the aggressor node set, the core network identifier of the victim node set may be acquired by monitoring the reference signal by the aggressor base station. Thus, when the response message is sent, the second response sending module 134 may fill in the core network identifier of the victim node set in the destination address, and then, the response message is routed to the set center node of the victim node set.

In other examples of this embodiment, the addressing identifier carried in the reference signal may further be the base station identifier of the victim base station. In this case, the core network element or the network management and server may not need to pre-store the mapping between the addressing identifiers and the route information. The second response sending module 134 may directly send the response message according to the addressing identifier acquired from the reference signal. The response message may be directly sent to the victim base station instead of being sent to the set center node on a victim base station side and then notified by the set center node.

Compared with the set identifier, the base station identifier can make it easier for the second response sending module 134 to send the response message. However, compared with the set identifier, the base station identifier occupies more bits in the reference signal. For example, a base station identifier of a 5G base station usually has 22 bits to 32 bits, a base station identifier of a 4G macro base station usually has 20 bits, a base station identifier of a 4G home base station usually has 28 bits, a base station identifier of a 4G short base station usually has 18 bits, and a base station identifier of a 4G long base station usually has 21 bits.

In an example of this embodiment, the response message sent by the second response sending module 134 to the victim node set may include one or more of the following content: 1) relevant information of the reference signal received by the aggressor base station, for example, at least one of a frequency offset, sequence information, a time-frequency position for receiving the reference signal, or the like; 2) a radio time domain resource configuration of the aggressor base station, for example, an uplink and downlink subframe configuration of a TDD system; 3) antenna information of the aggressor base station, such as an antenna direction and an antenna height; or 4) an atmospheric waveguide interference control strategy of the aggressor base station.

According to the response message sending apparatus in this embodiment, the aggressor base station monitors the reference signal, after the reference signal sent by the victims base station is monitored, the response message sending apparatus of the aggressor node set sends the response message to the victim node set according to the addressing identifier carried in the reference signal, so that the victim base station knows that the aggressor base station has monitored the reference signal, and further, the atmospheric waveguide interference control is implemented in cooperation with an aggressor base station side, thereby avoiding the problem that the atmospheric waveguide interference affects the victim base station for a long time and causes poor communication quality of the victim base station.

Embodiment Eight

Figure 14:
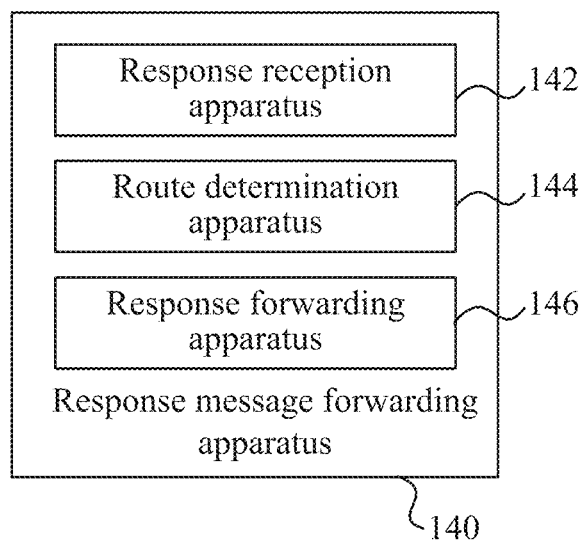
FIG. 14 is a structural diagram of a response message forwarding apparatus according to embodiment eight of the present disclosure.

This embodiment provides a response message forwarding apparatus that may be deployed in a core network element. Referring to FIG. 14, the response message forwarding apparatus 140 includes a response reception module 142, a route determination module 144 and a response forwarding module 146. The response reception module 142 receives response information sent by an aggressor node set after the aggressor node set monitors a reference signal of a victim base station. The route determination module 144 is configured to determine route information corresponding to an addressing identifier of a victim node set according to a pre-acquired mapping between addressing identifiers of various node sets and route information of the various node sets. The response forwarding module 146 is configured to send a response message to the victim node set according to the route information.

When the response message forwarding apparatus 140 is deployed on the core network element, the functions of the response reception module 142 and the response forwarding module 146 may each be jointly implemented by a processor and a communication apparatus of the core network element, and the function of the route determination module 144 may be implemented by the processor of the core network element.

Firstly, the response reception module 142 receives response information sent by the aggressor node set after the aggressor node set monitors the reference signal of the victim base station. In this embodiment, in the case where the mapping is stored in the core network element, when the aggressor node set sends the response message, a set identifier may be directly carried in the response message, and the response message is sent to the response reception module 142. It is to be understood that the core network element refers to a core network element on an aggressor node set side. It may be the aggressor base station or a set center node of the aggressor node set that sends the response message.

Then, the route determination module 144 determines the route information corresponding to the addressing identifier of the victim node set according to the pre-acquired mapping between the addressing identifiers of the various node sets and the route information of the various node sets.

After the response reception module 142 receives the response message, the route determination module 144 may query about the pre-acquired mapping to determine the route information corresponding to the set identifier. Then, the response message is sent to the victim node set according to the route information. For example, in the case where the addressing identifier is the set identifier, the response forwarding module 146 may send the response message to a set center node corresponding to the victim node set.

There is no doubt that in this solution, the core network element on the aggressor node set side needs to pre-acquire the mapping between the route information and the set identifiers of the various node set. At least a mapping between the route information of the victim node set and the set identifier of the victim node set needs to be acquired. It is to be understood that the mapping may be acquired from others core network elements, for example, a core network element at a victim node set side.

In an example of this embodiment, for any node set, if a set center node is a core network element, the set center node may determine route information corresponding to this node set according to base station identifiers reported by various base stations in the node set. It is to be understood that the set center node may select route information of any base station in the node set as the route information of this node set, and the route information of the set center node may be used as the route information of the node set. On this basis, the core network element may determine a mapping between the route information and an addressing identifier of this node set. Then, the core network element and other core network elements may communicate acquired mappings between route information and addressing identifiers of node sets with each other. In this way, various core network elements may acquire the mappings between the various core network elements.

In another example of this embodiment, if the set center node is not the core network element, the set center node needs to report the mapping between the route information and the addressing identifier of this node set to core a network element connected to the set center node. The core network element performs mapping interactions with other core network elements to acquire mappings of node sets of various core network elements.

After the route determination module 144 determines the route information corresponding to the addressing identifier of the victim node set according to the pre-acquired mapping between the addressing identifiers of the various node sets and the route information of the various node sets, the response forwarding module 146 may forward the response message to the victim node according to the route information. It may be understood that since the addressing identifier of the victim node set at the core network element may correspond to route information of a certain base station in the victim node set, the response forwarding module 146 may send the response message to the base station, and then, the base station reports the reception of the response message to the set center node. Additionally, the addressing identifier of the victim node set at the core network element may correspond to the route information of the set center node of the victim node set. In this case, the response forwarding module 146 may send the response message to the set center node of the victim node set according to the route information.

According to the response message forwarding apparatus of this embodiment, the mapping between the addressing identifiers of the various node sets and the route information of the various node sets is pre-stored in the core network element, so that after the aggressor base station monitors the reference signal sent by the victim base station, the aggressor node set may feed back the response message to the victim base station via the core network element.

Additionally, the response message is sent by the node set, so that when the victim base station sends the reference signal, only the set identifier needs to be carried in the reference signal. Compared with a base station identifier, the set identifier is simpler so that the number of bits occupied by the addressing identifier in the reference signal can be reduced.

Embodiment Nine

This embodiment further provides a storage medium. The storage medium may store one or more computer programs that can be read, compiled and executed by one or more processors. In this embodiment, the storage medium stores at least one of an interference control program, a response message forwarding program, a first response message sending program or a second response message sending program. The interference control program is executable by one or more processors to implement any one of the interference control methods in the embodiments above. The response message forwarding program is executable by one or more processors to implement any one of the response message forwarding methods in the embodiments above. The first response message sending program is executable by one or more processors to implement the response message sending method in embodiment two above. The second response message sending program is executable by one or more processors to implement the response message sending method in embodiment three above.

Figure 15:
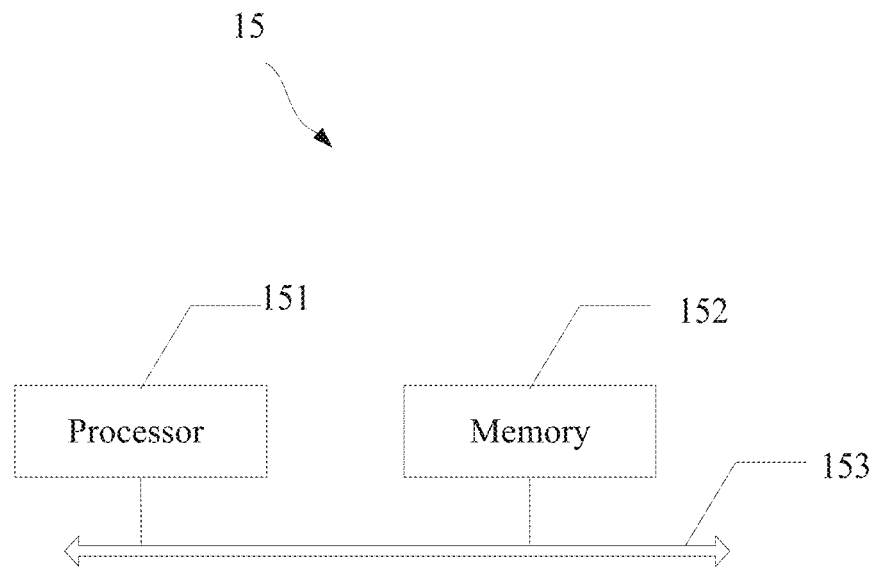
FIG. 15 is a structural diagram of a communication device according to embodiment nine of the present disclosure.

This embodiment further provides a communication device. As shown in FIG. 15, the communication device 15 includes a processor 151, a memory 152, and a communication bus 153 for connecting the processor 151 and the memory 152. The memory 152 may be a storage medium storing at least one of the interference control program, the response message forwarding program, the first response message sending program or the second response message sending program above.

If the memory 152 stores the interference control program, the processor 151 may read the interference control program, compile the interference control program, and execute the interference control program to perform the steps of the interference control method described in the embodiments above. The communication device 15 may be a base station. For details about how the communication device 15 performs the interference control method, refer to the description of the preceding embodiments. The details are not repeated here.

If the memory 152 stores the response forwarding program, the processor 151 may read the response forwarding program, compile the response forwarding program, and execute the response forwarding program to perform the steps of the response forwarding method described in the embodiments above. The communication device may be a core network element. For details about how the communication device 15 performs the response message forwarding method, see the description of the preceding embodiments. The details are not repeated here.

If the memory 152 stores the first response message sending program, the processor 151 may read the first response message sending program, compile the first response message sending program, and execute the response message sending program to perform the steps of the response message sending method described in embodiment two. The communication device 15 may be a base station. For details about how the communication device 15 performs the response message sending method, refer to the description of the preceding embodiments. The details are not repeated here.

If the memory 152 stores the second response message sending program, the processor 151 may read the second response message sending program, compile the second response message sending program, and execute the second response message sending program, so as to perform the steps of the response message sending method described in embodiment three. The communication device may be a set center node such as a base station, a core network element or a CU device. For details about how the communication device 15 performs the response message sending method, see the description of the preceding embodiments. The details are not repeated here.

The embodiment further provides a communication system. The communication system includes a victim node set and an aggressor node set that can communicate with each other. The victim node set includes a victim base station. The aggressor node set includes an aggressor base station. The victim base station is a communication device whose processor can execute the interference control program above. The aggressor base station is a communication device whose processor can execute the first response message sending program. For details about the cooperation of various devices in the communication system to implement the atmospheric waveguide interference control, see the description in the preceding embodiments. The details are not repeated here.

According to a communication device and system in this embodiment of the present disclosure, a reference signal sent by a victim base station carries an addressing identifier. The addressing identifier corresponds to route information of a node set to which the victim base station belong, that is, the victim node set. Thus, when an aggressor base station monitors the reference signal sent by the victim base station, an aggressor node set may send a response message to the victim node set according to the addressing identifier, so that the victim base station in the victim node set can respond to the message to determine that the aggressor base station has received the reference signal sent by the victim base station, and thereby, other processes of atmospheric waveguide interference control are performed next. By carrying the addressing identifier in the reference signal, it is possible for an aggressor node side to send a message to a victim node side. This solves the problem that an aggressor base station side cannot send a message to a victim base station side to notify the victim base station side that the aggressor base station side has monitored the reference signal in the related atmospheric waveguide interference control solution, thereby helping to implement the atmospheric waveguide interference control.

Embodiment Ten

To make the advantages and details of the interference control solution in the preceding embodiments more apparent for those of ordinary skill in the related art, a further description is given in this embodiment in conjunction with specific examples on the basis of the preceding embodiments.

Example 1

Node Set Establishment Process

In step 1, an operator configures a base station, a DU device and a cell with a SET identifier to which the base station, the DU device and the cell belong. According to the configuration of a network management, the base station, the DU and the cell may know network address information corresponding to a set center node, for example, stream control transmission protocol (SCTP) address information of the set center node.

In step 2, the base station, the DU device and the cell send correspondence between a cell identifier and a set center identifier to the set center node.

A message carrying the correspondence is contained in an interface message. In some examples, the interface message includes the cell identifier, a base station and DU device number, an IP address and SET information. The interface includes, but is not limited to, any one of an S1 interface, an NG interface, an X2 interface, an XN interface or an F1 interface.

In step 3, the set center identifier feeds back an acknowledgement message in the interface.

Example 2

A Set Center node of a Victim Node Set Confirms an Interference Source

In step 1, when finding atmospheric waveguide interference, a base station, a cell or a DU device reports the interference situation to a set center node. The interference situation may be sent to the set center node through interface information. In some examples of this embodiment, the interface information reported in an interface includes: 1) frequency information of a victim device; 2) a frequency domain feature of an interfered signal of the victim device, for example, a step fading feature; 3) interfered time feature information of the victim device; and 4) interfered antenna information of the victim device, such as an antenna direction and/or an antenna height.

In step 2, the set center node processes interference information in a set. Optionally, the set center node compares interfered frequency information of various base stations, cells and the like, frequency domain features of interfered signals, and the like, the overall interference situation within the node set is determined, and an interference control strategy is determined.

For example, if only one or two base stations report interference and interference signals have different frequency domain features, then the set center node may determine that self-adjustment of the base station is the main method. The power, uplink time domain resources and the like of an interfered base station are adjusted. The atmospheric waveguide interference is adjusted through the self-adjustment of the base station. If most base stations in the set report interference and, for example, interference signals have basically same frequency domain features, the set center node needs to consider finding a far-end interference source to solve the interference problem.

Information sent by the base station, the cell or the DU helps the set center node to make decisions. For example, the orientation of the interference source may be roughly determined by comparing the directions of interfered antennas.

In step 3, the set center node instructs, by a notification, the base station or the DU device in the set to operate according to a cell level. The notification may be sent through interface information. The interface information may include: 1) RS information of this node set, 2) information of a cell needing to send an RS, and 3) information of a cell needing to perform resource self-adjustment.

Example 3

A Set Center Node of an Aggressor Node Set Confirms an Aggressor

In step 1, a set center node acquires node information in a set.

After the set center node of an aggressor node set receives a notification of a network management message, the monitoring situation of atmospheric waveguide interference is acquired from a base station or a DU device in the set. The set center node sends a message to the base station or the DU device through an interface message. The message may contain an indication for start the monitoring.

Step 2: The base station or the DU reports a monitoring result. An aggressor base station or the DU device reports monitored reference signal information of a victim base station. The monitoring result may be sent by using interface information. The interface information includes: 1) RS information received by an aggressor device, such as an offset, sequence information, a time-frequency position for receiving the RS, and the like; 2) a radio time domain resource configuration of the aggressor device, for example, an uplink and downlink subframe configuration of a TDD system; and 3) antenna information of the aggressor device, such as an antenna direction and/or an antenna height.

In step 3, the set center node processes the interference information. Optionally, the set center node compares the reference signal information obtained by the aggressor base station or the DU device, and the orientation of the victim base station is determined.

Example 4

A First Mode for Routing a Response Message to a Victim Node Set by an Aggressor Node Set In this example, an RS signal sent by a victim base station carries a set identifier. It is assumed that an aggressor node set sends a response message in the mode of forwarding by a core network.

It is to be understood that before the response message is sent, it is necessary to configure a relationship between the set identifier and a route of an interfered device. If a set center node is a base station, the core network needs to be notified of the set identifier. The core network records a relationship between the set identifier and the base station and communicates the relationship between core networks. In this case, an NG interface (or an S1 interface) is affected, and an interface between core network elements is affected, for example, an S10 interface. If the set center node is a CU device, the CU device needs to notify the core network of the set identifier. The core network records a relationship between the set identifier and the CU device and communicates the relationship between core networks. In this case, an NG interface (or an S1 interface) and an F1 interface are affected, and the interface between core network elements is affected, for example, an S10 interface. If the set center node is a core network element, core network elements need to communicate set information with each other. In this case, the interface between core network elements is affected, for example, an S10 interface.

In step 1, the victim base station or the set center node of the victim node set sends a reference signal. The reference signal contains the set identifier.

In other cases, the reference signal may carry a tracking area identity (TAI) corresponding to the set identifier.

In step 2, an aggressor base station or the set center node of the aggressor node set sends a message to the victim base station via a network.

After the aggressor base station receives the reference signal sent by a destination base station, the aggressor base station or the set center node of the aggressor node set sends a message to the victim base station via the network. For sending the message by the aggressor base station or the set center node of the aggressor node set, an identifier or an IP address of the aggressor base station or the set center node of the aggressor node set is filled in as a source address, and the set identifier is filled in as a destination address. If the aggressor center node is a core network element, the message is delivered to a destination core network element according to the set identifier in the destination address. If the aggressor center node is a base station, the message is forwarded to a core network element connected to the center node, and then, the message is forwarded to the destination core network element.

In step 3, the destination core network element routes the message to the victim base station or the set center node of the victim node set according to the stored correspondence between the set identifier and the device.

In some cases, the core network element may further determine a destination network element by using the tracking area identity (TAI).

Example 5

A Second Mode for Routing a Response Message to a Victim Node Set by an Aggressor Node Set In this example, an RS signal sent by a victim base station carries a set identifier. It is assumed that a mapping is pre-stored in a network management or a DNS server. Optionally, a set identifier and a corresponding base station identifier, tracking area identity (TAI) and operator information (PLMN) may be configured in the network management or the DNS server. The set identifier is a value having a length of about 10 bits. The base station identifier is a value having a length of 20 bits to 32 bits. The TAI and the PLMN each has 32 bits.

Figure 16:
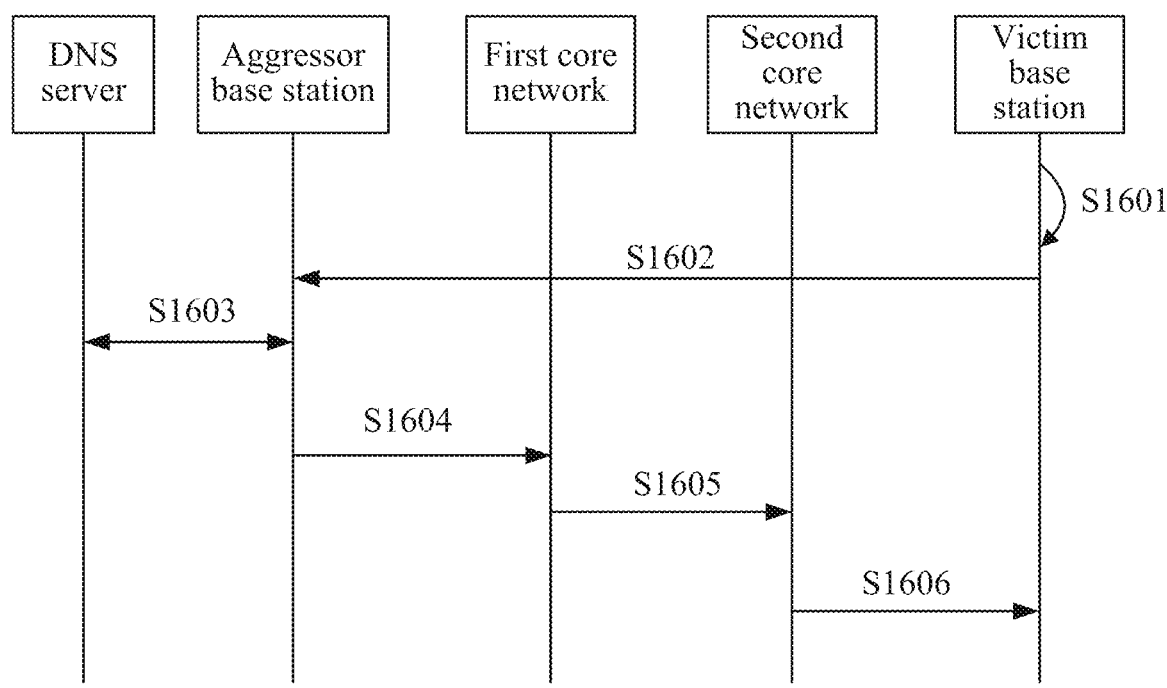
FIG. 16 is a flowchart of a response information transmission solution according to example 5 of embodiment ten of the present disclosure.

A description is given below in conjunction with the interaction diagram shown in FIG. 16.

In step S1601, the victim base station finds and determines atmospheric waveguide interference.

In step S1602, the victim base station sends the RS on an air interface.

The reference signal carries a set identifier to which a cell of a sending base station belongs.

In step S1603, after the aggressor base station receives the reference signal sent by the victim base station, the reference signal is converts into a TAI, PLMN information and an identifier of a destination base station according to the mapping in the DNS server.

After the aggressor base station receives the reference signal, the set identifier is resolved. By querying the network management or the DNS server, information of the destination base station may be obtained. The information includes the base station identifier of the destination base station, the TAI information of the destination base station, and the PLMN information of the destination base station.

In step S1604, the aggressor base station sends a response message to a first core network element.

The aggressor base station notifies the victim base station through a core network that the victim base station has received the reference signal. The aggressor fills the base station identifier of the victim base station as a destination address in the response message. The a tracking area identity, operator information and other information are also filled in. TAI information of the aggressor base station, PLMN information of the aggressor base station, and a base station identifier of the aggressor base station are filled in as a source address. It is to be understood that the aggressor base station fills in the response message for the purpose of notifying the atmospheric waveguide interference. The aggressor base station may reuse an S1 message to send the response message, for example, a base station configuration transfer (eNB CONFIGURATION TRANSFER) message.

Alternatively, the aggressor base station may reuse an NG message to send the response message.

In step S1605, the first core network element routes the message to a second core network element.

After the core network receives the message, the message is routed to the destination core network element, that is, the second core network element, according to the destination address. Since the physical distance between the aggressor base station and the victim base station may reach 300 kilometers, the forwarding process needs to pass through one or more core network elements.

In step S1606, the second core network element sends the response message to the victim base station.

The victim base station receives the message acknowledging that the aggressor base station receives the reference signal. The second core network element may use an S1 message to send the response message to the victim base station. For example, the response message may be sent to the victim base station through an MME configuration transfer (MME CONFIGURATION TRANSFER) message. It is to be understood that in some cases, the response message may be sent to the victim base station by using an NG message.

Example 6

A Third Mode for Routing a Response Message to a Victim Node Set by an Aggressor Node Set In this example, an RS signal sent by a victim base station carries a set identifier. It is assumed that an aggressor node set sends a response message in the mode of forwarding via an interface between base stations.

It is to be understood that before the response message is sent, it is necessary to configure a relationship between the set identifier and a route of an interfered device. If a set center node is a base station, base stations of the set center node need to communicate correspondence between set identifier information and base station information with each other. In this case, an X2 interface and an XN interface are affected. If the set center node is a CU device, CU devices also need to communicate correspondence between set identifier information and base station information with each other. In this case, an X2 interface, an XN interface and an F1 interface are affected.

In step 1, the victim base station or a set center node of the victim node set sends a reference signal. The reference signal contains the set identifier.

In step 2, an aggressor base station or the set center node of the aggressor node set sends the message to the victim base station via a network.

After the aggressor base station receives the reference signal sent by the destination base station, the aggressor base station or the set center node of the aggressor node set sends the message to the victim base station via the network. For sending the message by the aggressor base station or the set center node of the aggressor node set, an identifier or an IP address of the aggressor base station or the set center node of the aggressor node set is filled in as a source address, and the set identifier carried in the reference signal is filled in as a destination address.

Example 7

A Fourth Mode for Routing a Response Message to a Victim Node Set by an Aggressor Node Set In this example, an RS signal sent by a victim base station carries a set identifier (or other base station information). It is assumed that an aggressor node set sends a response message in the mode of forwarding through a core network.

In step 1, the victim base station or a set center node of a victim node set sends the reference signal. The reference signal contains the set identifier.

In step 2, an aggressor base station or a set center node of the aggressor node set sends the message to the victim base station via the network.

After the aggressor base station receives the reference signal sent by the destination base station, the aggressor base station or the set center node of the aggressor node set sends the message to the victim base station via the network.

For sending the message by the aggressor base station or the set center node of the aggressor node set, an identifier or an IP address of the aggressor base station or the set center node of the aggressor node set is filled in as a source address, and the destination base station identifier is filled in as a destination address.

If the aggressor center node is a base station, the message is forwarded to a connected core network element, and then, the message is forwarded to a destination network element, that is, a network element of a victim node set side.

In step 3, the core network element routes the message to the destination network element according to correspondence between base station identifiers and devices.

Example 8

A Fifth Mode for Routing a Response Message to a Victim Node Set by an Aggressor Node Set In this example, an RS signal sent by a victim base station carries a set identifier (or other base information). It is assumed that an aggressor node set sends a response message in the mode of forwarding by a core network.

In step 1, the victim base station or a set center node of a victim node set sends the reference signal. The reference signal contains a base station identifier of the victim base station.

In step 2, an aggressor base station or a set center node of the aggressor node set sends the message to the victim base station via an interface between base stations.

After the aggressor base station receives the reference signal sent by the destination base station, the aggressor base station or the set center node of the aggressor node set sends the message to the victim base station via the interface between base stations.

For sending the response message by the aggressor base station or the set center node of the aggressor node set, an identifier or an IP address of the aggressor base station or the set center node of the aggressor node set is filled in as a source address, and a identifier of the victim base station is filled in as a destination address.

The response message is forwarded to a destination network element via an X2 interface and an XN interface.

Example 9

A Sixth Mode for Routing a Response Message to a Victim Node Set by an Aggressor Node Set In step 1, a victim base station or a set center node of a victim node set sends a reference signal.

The reference signal contains a core network identifier.

In step 2, an aggressor base station or a set center node of an aggressor node set sends a message to the victim base station via a network.

After the aggressor base station receives the reference signal sent by the victim base station, the aggressor base station or the set center node of the aggressor node set sends the message to the victim base station via the network. For sending the message by the aggressor base station or the set center node of the aggressor node set, an identifier or an IP address of the aggressor base station or the set center node of the aggressor node set is filled in as a source address, and a destination core network identifier, that is, the core network identifier carried in the reference signal, is filled in as a destination address.

Step 3: A core network element on an aggressor node set side routes the message to a destination core network element according to the destination address.

After the destination core network receives the response message, the message is routed to an appropriate base station according to pre-configured information.

It is to be understood by those of ordinary skill in the art that interference control method and apparatus, the response message sending method and apparatus, response message forwarding method and apparatus, the terminal, the base station, and the storage medium provided in the embodiments of the present disclosure are applicable not only to a 5G communication system, but also to any future communication system.

In the present application, if not in collision, the features of the various embodiments may be combined with each other and used in the same embodiment.

Apparently, those of ordinary skill in the art should understand that functional modules/units in all or part of the system, the apparatuses and the steps of the method disclosed above may be implemented as software (which may be implemented by computer program codes executable by a computing apparatus), firmware, hardware, and appropriate combinations thereof. In the hardware implementation, the division of the functional modules/units mentioned in the description above may not correspond to the division of physical components. For example, one physical component may have multiple functions, or one function or step may be performed jointly by several physical components. Some or all physical components may be implemented as software executed by a processor such as a central processor, a digital signal processor or a microcontroller, may be implemented as hardware or may be implemented as integrated circuits such as application-specific integrated circuits. Such software may be distributed on a computer-readable medium and executed by a computing apparatus. Moreover, in certain cases, the steps illustrated or described herein may be performed in a different order from the order described herein. Computer-readable media may include computer storage media (or non-transitory media) and communication media (or transitory media). As is known to those of ordinary skill in the art, the term computer storage media include volatile and non-volatile as well as removable and non-removable media implemented in any method or technology for storing information (such as computer-readable instructions, data structures, program modules or other data). The computer-storage medium includes, but is not limited to, a random access memory (RAM), a read-only memory (ROM), an electrically erasable programmable read-only memory (EEPROM), a flash memory, or other memory technologies, a compact disc read-only memory (CD-ROM), a digital video disk (DVD) or other optical disc storage, a magnetic cassette, a magnetic tape, disk storage or other magnetic storage apparatus, or any other medium used to store the desired information and can be accessed by a computer. Additionally, it is known to those of ordinary skill in the art that communication media typically include computer-readable instructions, data structures, program modules, or other data in modulated data signals such as carrier waves or other transmission mechanisms, and may include any information delivery medium. Therefore, the present disclosure is not limited to any particular combination of hardware and software.

What is claimed is:

1. An interference control method, comprising:
    sending a reference signal carrying an addressing identifier, wherein the addressing identifier corresponds to route information of a victim node set, and the victim node set comprises a victim base station;
    determining, according to a response message sent by an aggressor node set, that an aggressor base station receives the reference signal, wherein the aggressor base station belongs to the aggressor node set; and
    performing atmospheric waveguide interference control in cooperation with the aggressor base station;
    wherein before sending the reference signal carrying the addressing identifier, the method comprises:
    sending monitoring trigger information, the monitoring trigger information being used to trigger a base station which receives the monitoring trigger information and starts reference signal monitoring; wherein a number of hops is set in the monitoring trigger information, and the number of hops automatically decreases each time the monitoring trigger information passes through a base station or a core network element.

2. The method of claim 1, wherein the addressing identifier comprises a set identifier of the victim node set, and the determining, according to the response message sent by the aggressor node set, that the aggressor base station receives the reference signal comprises:
    receiving, according to the response message sent by the aggressor node set, a reception notification sent by a set center node of the victim node set; and
    determining, according to the reception notification, that the aggressor base station receives the reference signal.

3. The method of claim 1, wherein the reference signal further comprises at least one of the following pieces of information:
    an addressing type;
    an Internet protocol (IP) address of the victim base station;
    a cell identifier of an interfered cell;
    a tracking area identity (TAI) of an interfered cell;
    a TAI of the victim base station;
    a TAI of a node set to which the victim base station belongs;
    an operator network to which an interfered cell pertains;
    an operator network to which the victim base station pertains; or an operator network to which a node set to which the victim base station belongs pertains.

4. A communication device, comprising: a processor, a memory and a communication bus; wherein
    the communication bus is configured to implement connection and communication between the processor and the memory; and
    the processor is configured to execute an interference control program stored in the memory, so as to perform the method of claim 1.

5. A communication system, comprising: a victim node set and an aggressor node set capable of communicating with each other, wherein the victim node set comprises a victim base station, and the aggressor node set comprises an aggressor base station; the victim base station comprises a memory and a processor, the memory is configured to store an interference control program, and the processor is configured to execute the interference control program to perform the method of claim 1.

6. A response message sending method, comprising:
monitoring a reference signal, wherein the reference signal carries an addressing identifier corresponding to route information of a victim node set, and the victim node set comprises a victim base station; and
sending, after monitoring the reference signal sent by the victim base station, a response message to the victim node set according to the addressing identifier carried in the reference signal, wherein the response message is used for indicating that an aggressor base station monitors the reference signal sent by the victim base station;
wherein the addressing identifier comprises a set identifier of the victim node set, and a mode for sending the response message to the victim node set according to the addressing identifier carried in the reference signal comprises:
mode 1:
querying a network management or a server about route information of a victim base station corresponding to the set identifier, and acquiring, from the network management or the server, the route information of the victim base station corresponding to the set identifier, wherein the route information comprises a base station identifier of the victim base station, a tracking area identity (TAI) of the victim base station, and public land mobile network (PLMN) information of the victim base station; and
sending the response message to the victim base station according to the route information of the victim base station.

7. The method of claim 6, wherein the sending the response message to the victim node set according to the addressing identifier carried in the reference signal comprises:
sending the response message to the victim node set through a core network according to the addressing identifier carried in the reference signal; or
sending the response message to the victim node set through a communication interface between base stations according to the addressing identifier carried in the reference signal.

8. The method of claim 6, wherein the mode for sending the response message to the victim node set according to the addressing identifier carried in the reference signal further comprises:
mode 2:
sending response information carrying the set identifier to a core network element to enable the core network element to determine the route information of the victim node set according to a pre-acquired mapping between addressing identifiers of a plurality of node sets and route information of the plurality of node sets, and sending the response message to the victim node set according to the determined route information.

9. A communication device, comprising: a processor, a memory and a communication bus; wherein
the communication bus is configured to implement connection and communication between the processor and the memory; and
the processor is configured to execute a response message sending program stored in the memory, so as to perform the method of claim 6.

10. The device of claim 9, wherein the sending the response message to the victim node set according to the addressing identifier carried in the reference signal comprises:
sending the response message to the victim node set through a core network according to the addressing identifier carried in the reference signal; or
sending the response message to the victim node set through a communication interface between base stations according to the addressing identifier carried in the reference signal.

11. The device of claim 9, wherein the mode for sending the response message to the victim node set according to the addressing identifier carried in the reference signal further comprises:
mode 2:
sending response information carrying the set identifier to a core network element to enable the core network element to determine the route information of the victim node set according to a pre-acquired mapping between addressing identifiers of a plurality of node sets and route information of the plurality of node sets, and sending the response message to the victim node set according to the determined route information.

12. A communication system, comprising: a victim node set and an aggressor node set capable of communicating with each other, wherein the victim node set comprises a victim base station, and the aggressor node set comprises an aggressor base station; the victim base station comprises a memory and a processor, the memory is configured to store a response message sending program, and the processor is configured to execute the response message sending program to perform the method of claim 6.

13. The method of claim 6, wherein the addressing identifier comprises a base station identifier of the victim base station, and sending the response message to the victim node set according to the addressing identifier carried in the reference signal comprises:
sending the response message to the victim base station in the victim node set according to the base station identifier.

14. A response message sending method, comprising:
acquiring a monitoring result of a reference signal by a base station belonging to a set center node of an aggressor node set, wherein the reference signal carries an addressing identifier corresponding to route information of a victim node set, the victim node set comprises a victim base station, and the aggressor node set comprises an aggressor base station; and
sending a response message to the victim node set according to the addressing identifier carried by the reference signal monitored by the aggressor base station, wherein the response message is used for indicating to the victim base station that the aggressor base station monitors the reference signal;
wherein the addressing identifier comprises a set identifier of the victim node set, and a mode for sending the response message to the victim node set according to the addressing identifier carried by the reference signal monitored by the aggressor base station comprises:
mode 1:
querying a network management device or a server about route information of a victim base station corresponding to the set identifier, and acquiring, from the network management device or the server, the route information of the victim base station corresponding to the set identifier, wherein the route information comprises a base station identifier of the victim base station, a tracking area identity (TAI) of the victim base station, and public land mobile network (PLMN) information of the victim base station; and sending the response message to the victim base station according to the route information of the victim base station.

15. The method of claim 14, wherein the sending the response message to the victim node set according to the addressing identifier carried in the reference signal monitored by the aggressor base station comprises:

sending the response message to the victim node set through a core network according to the addressing identifier; or sending the response message to the victim node set through a communication interface between base stations according to the addressing identifier.

16. The method of claim 14, wherein the mode for sending the response message to the victim node set according to the addressing identifier carried by the reference signal monitored by the aggressor base station further comprises:

mode 2:

sending response information carrying the set identifier to a core network element to enable the core network element to determine the route information of the victim node set according to a pre-acquired mapping between addressing identifiers of a plurality of node sets and route information of the plurality of node sets, and sending the response message to the victim node set according to the determined route information.

17. The method of claim 14, wherein the addressing identifier comprises a base station identifier of the victim base station, and the sending the response message to the victim node set according to the addressing identifier carried in the reference signal monitored by the aggressor base station comprises:

sending the response message to the victim base station in the victim node set according to the base station identifier.

18. The method of claim 14, wherein in a case where a set center node of the victim node set is a core network element, the addressing identifier comprises a core network identifier of the victim base station, and the sending the response message to the victim node set according to the addressing identifier carried by the reference signal monitored by the aggressor base station comprises:

sending the response message to the set center node of the victim node set according to the core network identifier.

19. A communication device, comprising: a processor, a memory and a communication bus; wherein the communication bus is configured to implement connection and communication between the processor and the memory; and the processor is configured to execute a response message sending program stored in the memory, so as to perform the method of claim 14.

20. A communication system, comprising: a victim node set and an aggressor node set capable of communicating with each other, wherein the victim node set comprises a victim base station, and the aggressor node set comprises an aggressor base station; the victim base station comprises a memory and a processor, the memory is configured to store a response message sending program, and the processor is configured to execute the response message sending program to perform the method of claim 14.

* * * * *